United States Patent [19]

Milligan et al.

[11] 4,393,445

[45] Jul. 12, 1983

[54] INFORMATION-SIGNAL RECORDING APPARATUS EMPLOYING RECORD VOLUME ORIENTED IDENTIFICATION SIGNALS

[75] Inventors: Charles A. Milligan, St. David; Edwin R. Videki, II; Winston F. Yates, both of Tucson, all of Ariz.

[73] Assignee: International Business Machines Corporation, Armonk, N.Y.

[21] Appl. No.: 241,172

[22] Filed: Mar. 6, 1981

[51] Int. Cl.³ .................... G06F 13/04; G11B 15/18
[52] U.S. Cl. .................................. 364/200; 360/72.2
[58] Field of Search ... 364/200 MS File, 900 MS File; 360/72.2

[56] References Cited

U.S. PATENT DOCUMENTS 3,366,928  1/1968  Rice et al. ........................ 364/200

Primary Examiner—Raulfe B. Zache
Attorney, Agent, or Firm—H. F. Somermeyer

[57] ABSTRACT

A peripheral subsystem, such as a tape storage subsystem, assigns logical and physical values to blocks of signals received from a host. A host can retrieve such values for use later to locate the blocks of signals and for error recovery purposes. In a buffered peripheral subsystem, such values define current signal transfer status of the buffer.

3 Claims, 19 Drawing Figures

INFORMATION-SIGNAL RECORDING APPARATUS EMPLOYING RECORD VOLUME ORIENTED IDENTIFICATION SIGNALS

BACKGROUND OF THE INVENTION

The present invention relates to data storage subsystems and apparatus which are capable of storing digital data, as well as image data; the invention relates to improvements in the construction and methods of operation of such subsystems and for enabling more readily identifying stored data and recovering from errors, particularly when such information signal recording apparatus is a buffered apparatus.

Historically, tape recording apparatus have been used to store sequential data sets and log-type data sets for digital data processors. In many instances, such tape record storage apparatus was highly interactive with data processing operations. In high performance data processing sites, such tape recorders employed vacuum column buffering of the tape for enabling the tape recorder to rapidly access data recording areas of the tape. Such a taper recorder is shown in U.S. Pat. No. 3,057,568 by Weidenhammer. Such tape recorders typically employed reels of tape having 2,400 feet of tape consisting of a magnetic coating on a polyester substrate. As such, the tape media were error prone. Typically, the tape media contained no physical identification on the tape except for recorded signals. Generally, the recorder received the signals from a host computer with each block of signals being of indeterminate length; that is, the host determines the number of signals to be recorded in each block; the length of each block being independent of the data storage subsystem. Utilization of tape recorders was typically a tape drive pooling arrangement; that is, when a spool of tape was mounted for recording or readback on a given tape recorder, single host usually communicated with that recorder for recording and reading signals on and from the mounted magnetic tape. In some logging operations, a plurality of hosts recorded on a single tape spool, hereinafter referred to as a tape volume; even then a given host would record its log data and then turn the recorder over to another host for the other host to record its log data. As such, the tape recorder was still in a pooling arrangement as opposed to a time sharing arrangement, as is commonly found with direct access storage devices. In accordance with this practice, it was not uncommon to find that a complete reel of tape would be read into data processing apparatus and then after suitable data processing functions on the data, the entire tape would be recorded. Generally, each tape volume was dedicated for a single purpose or for a single user. The term "user" means a process or a group of related processes being executed on a host processor.

Because of the aforementioned error prone media, once the signals are recorded on a tape, there is a low probability that an entire block of data can be lost due to imperfections in the media that occur after the recording; therefore, on a single tape volume of 2400 feet of tape, a previously recorded block of data signals can be entirely lost. When the data blocks are of indeterminate lengths, the only safeguard is to provide a header and a trailer label on the tape. Both labels would contain the number of blocks of data recorded on that tape. Then as the blocks are read off the tape, the count is kept to determine whether or not all the blocks were successfully recovered. Other techniques included the host assigning serial numbers to each of the data blocks, i.e., each data block will have a header area in which certain identifying data is recorded. Then the host, upon reading the data from the tape, requires its own programmed security procedures for insuring that all of the records were successfully recovered. Nothing in tape subsystems that were particularly adapted for recording blocks of indeterminate lengths provided facilities for enabling the host to analyze error situations in a more careful manner.

Some recording subsystems employed fixed length record areas. Such fixed length record areas can be large enough to accommodate most data blocks. If the fixed length data areas were not large enough to accommodate the data blocks, the segmentation of the data occurred. When such fixed length record areas are employed, the media usually contains permanently recorded or embossed area indicators. See U.S. Pat. No. 3,192,509. This arrangement increases the cost of the tape media. When tape media are employed primarily for archival purposes, an increased cost of the tape media is unacceptable; therefore, other means must be provided to economically insure a greater integrity of storage of signals when errors have occurred. Such enhancements are of particular importance to those recorders receiving blocks of data of indeterminate lengths.

Many tape recorders employing long lengths of tape in each tape volume will be subjected to various tape wrapping conditions; that is depending on the temperature and humidity of the environment in which the recorders operate, the tightness of the tape wrap can vary. Accordingly, it is difficult to precisely and repeatedly access a small area of the tape file in a reliable manner. It is desired, in conjunction with other factors discussed herein, to facilitate rapidly and accurately accessing an addressed small area in a tape volume.

It is also desired to reduce the cost of storage subsystems, particularly when such subsystems are used for archival purposes. Since vacuum column buffered tape recorders are expensive because of the cost of the tape vacuum columns, it is desired to use so-called "reel-to-reel" tape recorders. It is well known that the reel-to-reel tape recorders have notoriously poor access times compared to vacuum column tape recorders. In order to reduce the cost of tape recorders and yet provide the performance of vacuum column tape recorders, a large signal buffer is attached to the tape recorder. By promoting data using judicious motion techniques, the effective performance of a reel-to-reel tape recorder can approximate or better the access performance of many vacuum column tape recorders. Unfortunately, most buffers are volatile; that is, if power supply is removed from the buffer, the data is erased. Accordingly, techniques for reliably using a buffered reel-to-reel tape drive which facilitates recovery from power failure and other error conditions while enhancing access time to that of vacuum column tape recorders is needed.

SUMMARY OF THE INVENTION

A peripheral record storage subsystem for each received block of signals to be stored automatically assigns an identification having logical and physical reference value portions. Such identification can be viewed as addresses of the blocks of data. The assigned identifications are recorded on a record medium with each respective block of data signals. The logical portion preferably represents a logical position of the respective blocks of data in a series of blocks of data being recorded or existing on a record member. Such logical portion is generated and assigned by a controlling portion of the record subsystem. The physical reference value (PRV) indicates the approximate relative location of the record medium and a transducing means used to sense or record a block of data signals. In a tape storage subsystem, such physical reference value can be a tape length indicator (TLI) which may or may not have a predetermined relationship to tape recorder transport operations. In one constructed version of the invention, the physical reference values related to inertial aspects of tape accumulated on a machine reel.

The invention is preferably practiced in a record storage subsystem having a data buffer interposed between a data source sync such as a host computer and record storage apparatus. The assignments of the identifications occur when the blocks of signals are transferred from a data source-sink (host) to the data buffer. In a preferred form of the invention, two sets of identification signals are maintained in the storage subsystem for each record volume on the respective record storage apparatus. A first set of identification signals relate to the transfer of signal blocks between the source-sink and the buffer while a second set of identification signals relate to transfer of such blocks of signals between the buffer and the respective record storage apparatus. It is preferred that the first set of identification signals identify a next block of signals to be transferred between the source-sink and the buffer as if the record medium was transported in a forward direction. In a similar manner, the second set of identification signals identify the next block of signals to be transferred between the buffer and the respective record storage apparatus. For example, if there are eight record storage apparatus currently transferring signals to or from a data source-sink, then the subsystem will have eight first sets of identification signals and eight second sets of identification signals. When the first set of identification signals equals the second set of identification signals, the buffer has no blocks of signals related to a given record storage apparatus.

For enhancing total system operation; i.e., the operation of the data source-sink and the storage subsystem, provisions are made for transferring the subsystem maintained first and second sets of identification signals to the source-sink for later use in data recovery and recovery from error conditions. Provisions are also provided for the data source-sink to supply its received identification signals to the subsystem for facilitating data recovery.

While transferring signals from a data storage apparatus through a buffer to the source-sink, the two sets of identification signals signify the operational status of the subsystem with respect to such transfer. During such signal transfers, commonly referred to as readback, the second set of identification signals are read from the record medium and are incremented in accordance with the transfer of blocks of signals from the record storage apparatus to the buffer memory. The first set of identification signals reflect the transfer of blocks of signals from the buffer to the data source-sink. The difference between the two identification signals indicates the number of data blocks in the buffer yet to be transferred to the source-sink.

In a buffered signal storage subsystem, the buffer effectively controls the counting and assignment of a logical portion of the identification sets of signals. The record storage apparatus generates and assigns the physical reference values for both sets of identification signals. Both portions are always kept with the respective data blocks while the record blocks are recorded on the record medium or are in the buffer memory. In a constructed form of the invention, such identification signals are not sent to the host with the blocks of signals.

In an early constructed version of the invention, one set of identification signals was assigned for each data block in a record volume. In a tape subsystem, a record volume corresponds to a spool of tape. Therefore, each record volume has its own unique set of identification signals for all of the blocks of data stored therein. Alternative construction and methods of the invention include a plurality of sets of identification for a given record volume for creating virtual record volumes within each physical record volume. Also a virtual record volume may consist of a plurality of physical record volumes. In such a situation, a logical portion extends over a plurality of physical record volumes while the physical record values are unique to the respective physical record volume. Such physical record values would include a volume identification plus the physical location of the record on the record medium.

In other aspects of the invention, a plurality of signal recorders share a buffer memory which is dynamically partitioned to the respective signal recorders. The buffer memory independently and temporarily stores the blocks of signals in preparation for recording on the respective signal recorders or for transmission to a data source-sink. The logical and physical identification signals are handled independently for each of the partitions; each partition being a logical extension of the respective recorders.

The foregoing and other objects, features and advantages of the invention will be apparent from the following more particular description of preferred embodiments of the invention, as illustrated in the accompanying drawings.

THE DRAWINGS

DETAILED DESCRIPTION

Figure 1:
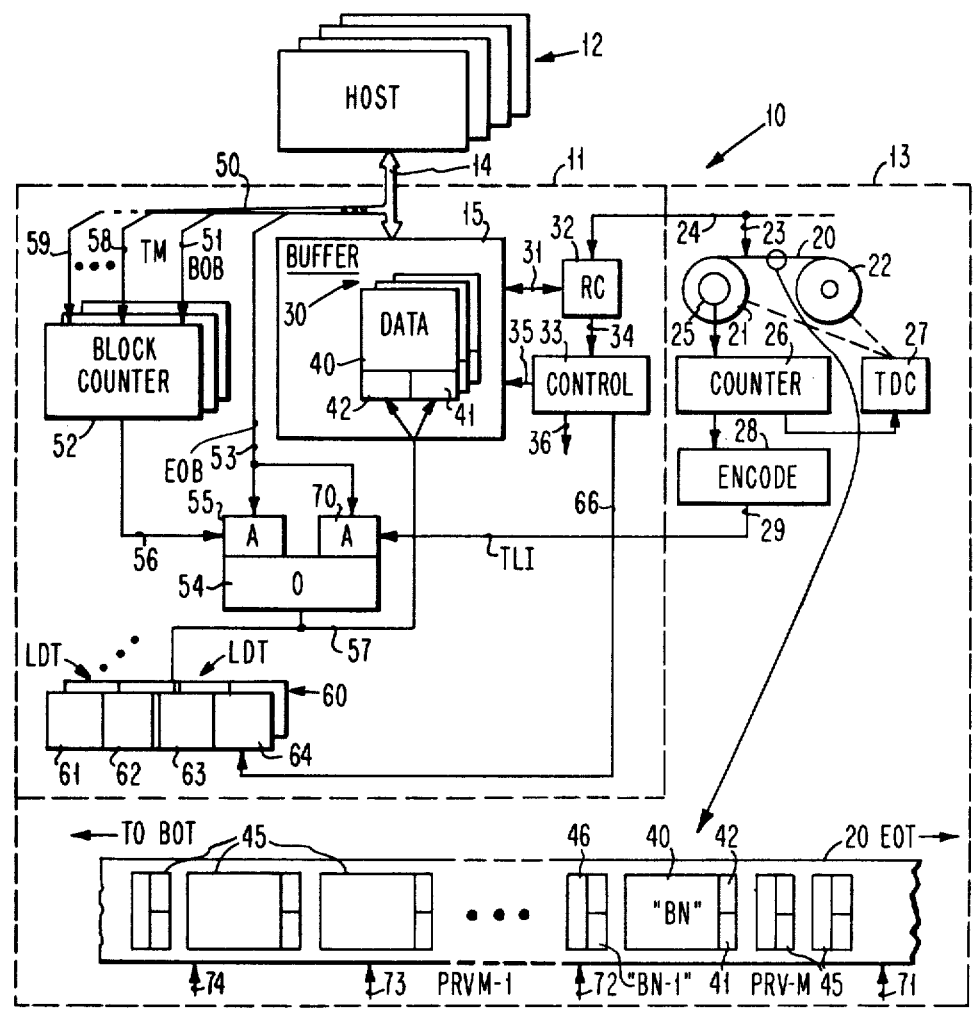
FIG. 1 is a diagrammatic showing of a storage subsystem employing the present invention for illustrating the assignments of identification signals to blocks of signals.

Referring now more particularly to the drawings, like numerals indicate like parts and structural features in the various illustrations. Peripheral subsystem 10, preferably a storage subsystem, includes a programmable control unit 11, connected to a plurality of hosts 12. Hosts 12 are central processing units in a data processing complex, no limitation thereto intended; as such, hosts 12 appear as data source-sinks to the subsystem 10. Control unit 11 selectively connects a host 12 to one of a plurality of devices or storage units 13, herein shown as tape recorders. The connection between the host 12 and control unit 11 is by an input/output channel 14. This connection is described in GA22-6974-4 entitled "IBM System/360 and System/370 I/O Interface Channel to Control Unit, Original Equipment Manufacturer's Information" File No. S360-S370-19 available from International Business Machines Corporation, Data Processing Division, 1133 Westchester Avenue, White Plains, N.Y. 10604 and represents the input/output connection as used on the various IBM System 360 and 370 computer systems. Control unit 11 includes a buffer memory 15 for buffering signals between the input-output channel 14 and the plurality of devices 13. The operation of buffer memory 15 as a dynamically mapped or partitioned buffer will become apparent from a reading of the description and can be managed in accordance with known memory management techniques.

In a practical constructed embodiment of the invention, each control unit 11 will connect to a plurality of devices 13 as shown later in the specification. Each device 13 is a tape recorder capable of selectively transporting a tape record medium 20 between a removable tape reel 22 and a machine tape reel 21. Such a tape recorder is referred to as a "reel-to-reel" tape recorder. Each device 13 has a transducer or head assembly 23 in transducing relationship to the tape record medium 20 and which includes the usual amplification circuit for transferring signals between tape record medium 20 and control unit 11. Cable 24, which for a nine-track tape contains 9 independent signal paths from nine heads in transducer assembly 23, is connected to recording circuits RC 32 of control unit 11 in the usual manner. Also, as usual, RC 32 is connected to a plurality of heads 23 in the respective plurality of devices 13.

On each machine reel 21 of each device 13, a tachometer assembly 25 indicates the rotational displacement of the machine reel 21. By suitable calculations, the speed of tape record medium 20 between the spools 21, 22 can be calculated. The physical displacement of tape medium 20 is maintained in a bidirectional counter 26, which physical displacement results in a physical reference value (PRV) used in connection with practicing the present invention. Counter 26 supplies its count signals to tape device control TDC 27 for controlling the transport of record medium 20 between reels 21 and 22. Such control is well known and not further described. Counter 26 also supplies its count representation of the physical displacement of tape record medium 20 between reels 21 and 22 to encoder 28 which encodes the count into tape length indicator, TLI, which in a first constructed version of the invention constitutes the physical reference value of the invention. TLI is supplied over cable 29 to control unit 11 for insertion into buffer 15 in a contiguous area with data, as will become apparent.

As mentioned earlier, buffer 15 is a dynamically managed memory such that portions of the address space of the multiple registers in the buffer memory 15 are assignable to one and only one of the devices 13. Such data areas are represented by numeral 30 and are designed such as to contain one or more blocks of signals to be recorded or read from tape record medium 20. For illustration purposes only, each data record area 30 is shown as storing one block of signals. It being understood that a plurality of blocks can be stored in such areas, such as 10 blocks of signals. Buffer 15 communicates with host 12 via channel 14 through the usual adapter circuits, later referred to in more detail. Buffer 15 also communicates directly with RC 32 over cable 31 in a usual manner. Operation of control unit 11 is supervised and sequenced by programmed control 33. Most of the operations of control 33 are those practiced in control units attached to System/360 and System/370 computers and are not described for that purpose. Only those portions of control 33 having a direct and pertinent relationship to an understanding of the present invention are detailed. Control 33 supervises and sequences RC 32 via a set of control signals supplied over cable 34. In a similar manner, control 33 supplies supervision and sequencing control over buffer 15 by signals transmitted over cable 35. Other portions of control unit 11 not herein illustrated in detail are sequenced and supervised by control signals supplied over cable 36. In accordance with the invention, operation of subsystem 10 as well as the cooperative relationship between host 12 and subsystem 10 is enhanced by control unit 11 assigning and tracking identification or address signals for each block of signals recorded on each tape record medium, also termed record volume. The format of signals recorded on tape record medium 20 are in blocks separated by the usual interblock gaps (IBG's). The Nth block of signals 40 not only contains host recorded data but also identification signals 41 and 42. Signals 42 constitute a logical portion of the identification signals and in a first constructed embodiment are a linear sequential count of record blocks recorded on tape record medium 20. For example, block N can have the value "N" in portion 42 or can have a displacement count such as N+K where K is a fixed factor indicating the length of the tape leader from a free end of the tape (not shown) to a logical beginning of tape, BOT. BOT is a reference point for recording on tape record medium 20, as is well known. In alternative embodiments, logical portion 42 need not be a linear count sequence but may be a non-linear or encrypted sequence for limiting the access to the logical portion of the blocks of signals recorded on a tape record medium. Portions 41 contain the physical reference values, which in the illustrated embodiment, are TLI's. All blocks of signals on tape record medium 20 have the same format irrespective of the length of blocks of signals, which can have indeterminate lengths.

It is common practice to record control blocks, such as tape marks, on a tape record medium. Block 46 is such a tape mark and corresponds to block BN-1. A control block of signals usually is never transmitted to host 12, but is used by control unit 11 for controlling certain aspects of subsystem operations, as is well known. Host 12 when recording signals on tape record medium 20 commands control unit 11 to record a tape mark, such as block 46, for later use in controlling operation of tape recorder 13. RC 32 when sensing a tape mark block 46 will cause control 33 to erase the tape mark from buffer 15. RC 32 may not detect a tape mark until after the entire block 46 has been transmitted to buffer 15. A bit position of a register in a control memory (not shown in FIG. 1) is set to signify a tape mark has been detected and this information can be supplied to host 12 in the usual manner. It is understood that other control blocks may be recorded on tape record medium 20 and handled in a similar manner.

The assignment of the identification signals having logical and physical portions are data independent; that is, control unit 11 is not aware nor does it have any signal indicating the actual informational content of the blocks of signals being recorded. The only relationship to the data is that all the data is on the same record volume consisting of a tape record medium 20. In the preferred form of the invention, one tape record medium 20 constitutes one physical record volume as well as one logical record volume, no limitation thereto intended. It is to be understood that the logical portion can extend over a plurality of physical tape volumes or a plurality of logical volumes can be actually recorded on a single tape volume. The physical reference value of course will indicate the actual relative location of tape record medium 20 to transducer 23 irrespective of the logical notations. In this manner, host 12 can analyze the data recovery, as well as perform error recovery.

The assignment of the logical portion of the identification signals in accordance with the invention to each block of signals received by buffer 15 from host 12 is next described. A block of signals is transferred to buffer 15 from host 12 using the above-described input/output channel connection. When one complete block of signals has been transmitted (the block length is indeterminate in that the control unit 11 is not aware of the number of signals in each block) the sending host 12 supplies a so-called COMMAND OUT signal which is transferred over line 50 and thence line 53 as an end of block (EOB) signal. The EOB signal on line 53 gates the logical count and the physical reference value count to buffer 15 for recording in data area 30. FIG. 1 illustrates data block 40 being recorded along with its physical and logical identifiers 41 and 42. The simplest recording sequence is to first record both the logical and physical portion of the identification signal with the data in the buffer 15. Alternatively, the physical and logical portions can be recorded in a separate look aside buffer system (not shown) so long as the logical relationship between the identification signals and the data signals is maintained.

Host 12 will signify to control unit 11 that assignment of the logical and physical identification signal to blocks of signals are to ensue by initiating a write command indicated in FIG. 1 on line 51 as a beginning of recording block signal (BOB). BOR clears the respective block counter 52 to zero. In this regard, there is one block counter for each device 13, connected to control unit 11. Since each device 13 can mount one and only one record volume at a time, the respective block count 52 assigned to the devices 13 correspond uniquely to the respective mounted tape volumes. Host 12 identifies the tape volume by the unique address of the device on which tape volume is mounted. Accordingly, when a BOB signal on line 51 is supplied by host 12, it is associated with a given device address and therefore clears one and only one of a plurality of block counters 52. When a block counter 52 is cleared to its reference value, that reference value is the logical identification of the first block of signals to be recorded on tape record medium 20 and to be received by buffer 15 from host 12 in the next ensuing transfer of data signals. When host 12 supplies an EOB signal for an addressed device 13, OR circuit 54 responds to the line 53 EOB signal to transfer the signal contents of the block counter 52 to portion 42 within data area 30. The EOB (end of block) signal received from host 12 and travelling on line 53 opens AND circuits 55 to pass the contents of the appropriate block counter 52 through OR circuits 54 to LDT 60 via bus 57. In a similar manner, the physical reference value TLI on cable 29 is transferred through AND circuits 70 of AND/OR 54 to portion 41 of data area 30 in buffer 15. Now the data block 40 has both the logical and physical portions of the identification signals in the buffer and the data block 40 can be recorded on tape 20. As shown for block "BN", block 40 identification signals 41, 42 are replicated on tape record member 20. It is not necessary for maintaining data block 40 entirely within buffer 15 before recording the identification signals in the buffer. However, timing of operations with subsystems is such that the identification signals 41, 42 are recorded contiguously on tape record member 20 preferably toward EOT (end of tape). Such timing control is well known in tape recorders for recording cyclic redundancy checks and the like at the EOT end of data blocks. Accordingly, a detailed description of this portion of the subsystem is dispensed with.

As mentioned earlier, host 12 can command the recording of a tape mark TM 46 onto tape record medium 20. Such command is encoded in the usual manner and supplied as an increment signal over line 58 to the appropriate block counter 52 for incrementing the logical portion of the identification signals. Other control signals commanded to be recorded are represented by the connection 59 to the block counters 52. Further, it may be desired to clear the signal contents of a given block counter 52 to a reference value when the tape record medium 20 is transported to BOT. Accordingly, control 33 through one of its control signals supplied over cable 36 can result in a given block counter 52 being cleared to the reference value.

The above description shows how the logical and physical portions of the identification signals are assigned to a given data block and recorded in buffer 15 in a contiguous manner with that data block. The data signal 40 has yet to be recorded on tape medium 20. Of course, this recording occurs through RC 32 in the usual manner. However, buffer 15 may contain a plurality of blocks to be recorded on tape record medium 20. In the event of a failure in the record storage subsystem or a power failure out of the buffer or for tape subsystem management purposes, it may be desired that host 12 quickly determine the number of data blocks in buffer 15 for one or more of the devices 13. In this regard, control unit 11 treats each portion 30 of buffer 15 as a logical extension of a device 13. In other words, the portions 30 corresponding to the various devices 13 are treated as "logical devices". The control of the buffer 15 using the logical device concept is through a logical device tables LDT 60. A portion of that table is shown in FIG. 1 as having four storage areas 61, 62, 63, and 64 for each of the devices 13, there being one set of registers for each device, each having the portions 61–64. Portions 61 and 62 are termed the channel of the LDT 60 and the signals are the channel set of identification signals. Portion 61 contains the physical reference value of the data block that appears to the host 12 as being the next data block on a tape record medium 20. This value is abbreviated as SCNLID in other figures. In a similar manner, portion 62 for each of the devices 13 contains the logical portion of the identification signals hereinafter referred to as SCNLID as will later be more fully described. During backward readback operations, the channel set of identification signals for each of the devices 13 reflects a somewhat different relationship to the data residing in buffer 15 than in a forward direction operation, such as for recording and read forward. In this regard, reading forward is moving the tape to the left as seen in FIG. 1 while moving the tape 20 to the right as shown in FIG. 1 is the backwards motion.

In a similar manner, portions 63 and 64 of LDT 60 respectively contains the PRV and the logical portion of the identifications signals relating to the transfer of data signals between buffer 15 and a given device 13, one device set of identification signals for each data area 30 in buffer 15. Portions 63 contain SDEVID which is the tape length indicator of the data block transferred or to be transferred when the tape record medium 20 is moved in the forward direction. In a similar manner, portions 64 contains the LDEVID or the logical portions of the data block identification of the next data block to be transferred between the buffer 15 and the device 13 as the record medium 20 is transported in the forward direction. From this definition, it can be readily seen that the difference in numerical values of the logical portions stored in LDT portions 61 and 63 indicate the number of data blocks residing in buffer 15. This number includes, of course, any tape marks or other control blocks commanded to be recorded by host 12 or sent from tape record medium 20. The identification signals in LDT 60 are available to host 12 through a channel command supplied over I/O channel 14 to control unit 11. Host 12 then determines the status of the peripheral subsystem as to the transfer of data between buffer 15 and a device 13. AND/OR circuit 54 accordingly not only supplies the identification signals from encode 28 and block counter 52 to data area 30 but also to portions 61, 62 of LDT 60. This action occurs for each of the devices at the termination of transfer of signals between a host 12 and buffer 15. Additionally, control 33 supplies similar signals over cable 66 to portions 63 and 64 for the transfers between buffer 15 and tape record medium 20, as will become more apparent.

The physical reference value used in the FIG. 1 illustrated system for both the channel and the device portion of LDT 60 are identical; that is, device 13 through encode 28 generates but one TLI: that TLI is supplied for both device and channel sets of identification signals. This action occurs because the physical segments of the record medium tape 20 are relatively long thereby encompassing a large number of signal blocks. For example, PRV-M (M is an integer) extends from carat mark 71 through carat mark 72 encompassing blocks 40, 46 and a plurality of other blocks 45. The next physical segment PRV-VM-1) extends from carat mark 72 through carat mark 74 and can encompass a larger number of blocks than PRV-M. In fact, in a constructed embodiment, the physical length of tape represented by the various PRV's is not constant but is related to certain inertial qualities of the operation of machine reel 21 which is beyond the scope of the present invention except that it relates to the inertial aspects; i.e., tape transport capability of a device 13.

In summary, FIG. 1 briefly shows the operation of a peripheral subsystem shown in the form of a tape storage subsystem which assigns and uses both logical and physical identification signals associated with each block of signals recorded in the respective record volumes addressed by the host 12 as mounted on a given device. It is to be understood that each record volume will have its own volume identification number independent of the device 13 on which it is mounted. Such volume identification is usually recorded in a header label (not shown) on a tape record medium 20 in the usual manner. Also, a trailer label may be recorded at the reel end of the tape record medium 20, such as is permanently secured to supply reel 22. The assignment of such identification signals is entirely by the peripheral subsystem with the logical portion being largely host dependent but data independent while the physical portion is recorder or device 13 dependent. With both types of indications in the identification signals, the accessing of data from a recorded tape record medium 20 is enhanced as will later be described, as well as facilitating recovery from error conditions on error prone record media.

Figure 2:
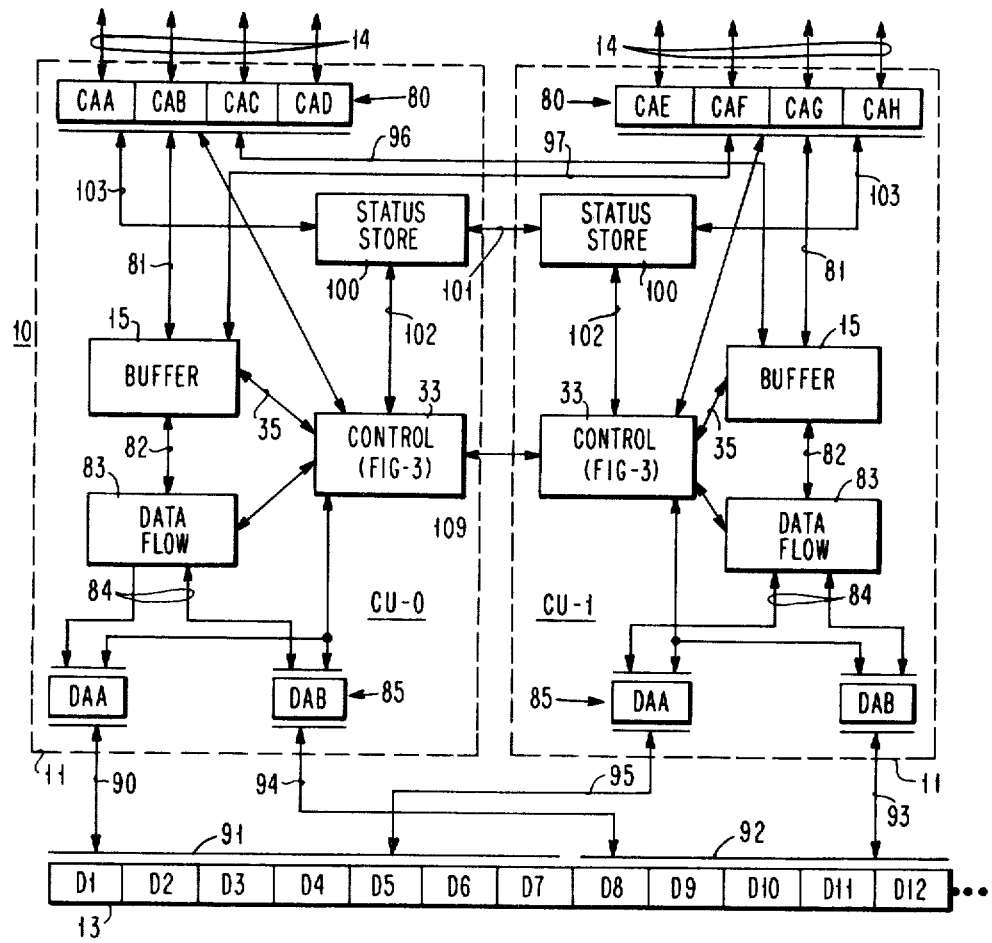
FIG. 2 is a block diagram of a storage subsystem of the tape recorder type which may employ the present invention to advantage.
Figure 3:
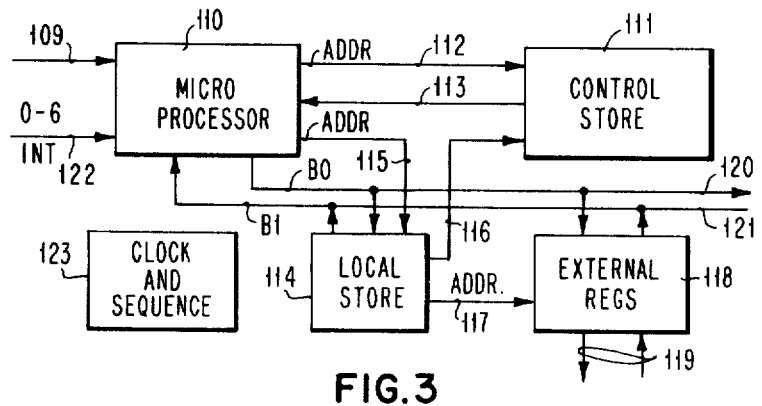
FIG. 3 is a block diagram of a microprocessor control for the FIG. 2 illustrated tape storage subsystem.
Figure 4:
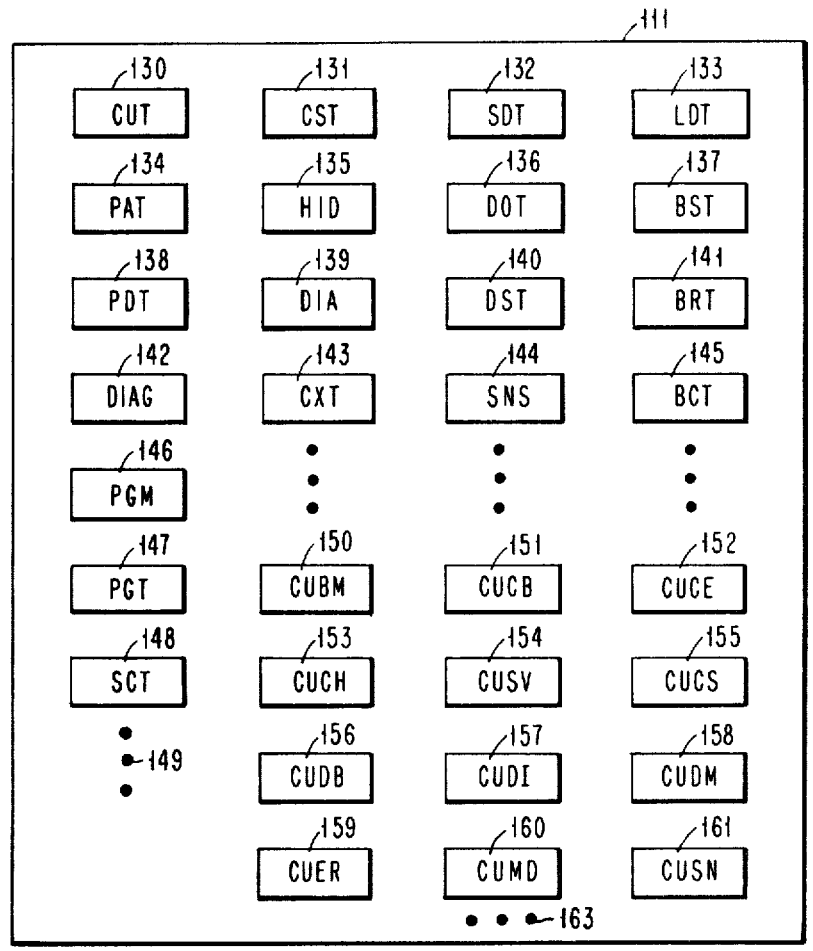
FIG. 4 is a control memory map for the microprocessor illustrated in FIG. 3.

Before further describing the invention, the environment in which the invention preferably resides is described with particular reference to FIGS. 2–4 which illustrates a storage subsystem employing reel-to-reel tape drives denominated as devices 13 D1–D12. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adapter circuits 80 which are individually denominated CAA–CAH. Each of the channel adapters 80 can communicate directly with a buffer 15 in either control unit 11. Both CU-0 and CU-1 are identically constructed. Accordingly, like numerals are indicating like parts in the two control units with the interconnections between the control units being separately denominated. Channel adapters CAA-CAD are in CU-0 while CAE-CAH are in CU-1. The respective channel adapters communicate with a buffer 15 in its own control unit via cable 81. Communications from the buffers to the devices 13 is over cable 82 through a data flow circuit 83, thence to cable 84 through a plurality of device adapter circuits 85. The device adapter circuits are separately denominated by characters DAA and DAB in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application Ser. No. 77,088.

The interconnections between the control units 11 and the devices 13 is on a primary/secondary basis. Devices D1-D7 are primary to CU-0 and secondary to CU-1. In a similar vein, devices D8-D15 (D13-D16 not shown) are primary to CU-1 and secondary to CU-0. The significance of primary and secondary connections relates to which of the control units CU-0 or CU-1 maintain status for the respective devices; i.e., the control unit CU-0 maintains status information for D1-D8 while CU-1 primarily maintains status information for D8-D16. As will become apparent, both control units CU-0 and CU-1 memorize status indications for all of the devices 13. In the primary connections, adapters DAA-DAB of CU-0 are connected via a cable 90 to all of the devices D1-D8. In a similar manner, the connection to D8-D16 to CU-1 is via cable 93 through adapters DAA-DAB. The secondary connection from CU-0 to devices D8-D16 is via cable 94 while CU-1 is connected to devices D1-D8 via cable 95. The operations between the device adapters 85 and the various devices D1-D15 includes tag control lines and bus data transfer lines which enables the control units 11 to closely control and operate devices 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connection from the channel adapter CAA through CAD and adapter CAE-CAH of CU-1 are as previously described. Connections from channel adapters CAA--CAD to the buffer 15 of CU-1 is via cable 96 whereas channel adapter CAE-CAH connects to the buffer 15 of CU-0 via cable 97. Accordingly, either data flow circuit 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any cross-connection between the channel adapters 80 and the buffers 15 is immediately indicated in both status stores 100. Each of the status stores 100 contain a plurality of registers for containing bits relating to device status, buffer status, channel status and the like. Such status information reflects the selection status of the device, its busy status, contingent connections and all other status necessary for operating the storage subsystem with the input/output channel 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 100 also communicates with the respective channel adapters in the control units 11 via cables 103. Such communication includes the supplying of device busy status to the channel adapters from the status store and the request for selection from the channel adapters to the status stores; that is, if CAB 80 wants to select device D6 on behalf of a host request, CAB 80 communicates with its status store 100 of CU0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adapters 80 and device adapters 85. Further communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 11, including microprogram instruction words, via bus 113. Of course, the usual idle scan loop for operating microprocessor 110 is resident in control store 111. Additionally, control 33 includes local store 114 which acts as a working control store for microprocessor 110. The addressable registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 is via sets of external registers 118 which are addressed by address signals supplied over bus 117 from local store 114, no limitation thereto intended. Communications from external registers 118 to the various elements of the control units 11 is via a pair of unidirectional buses 119 which are electrical connections made in the usual manner.

Microprocessor 110 includes the bus out BO 120 and bus in BI 121 which are connected to local store 114, external registers 118 and other units as may be desired. Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables a control unit 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information, control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15.

DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

Figure 5:
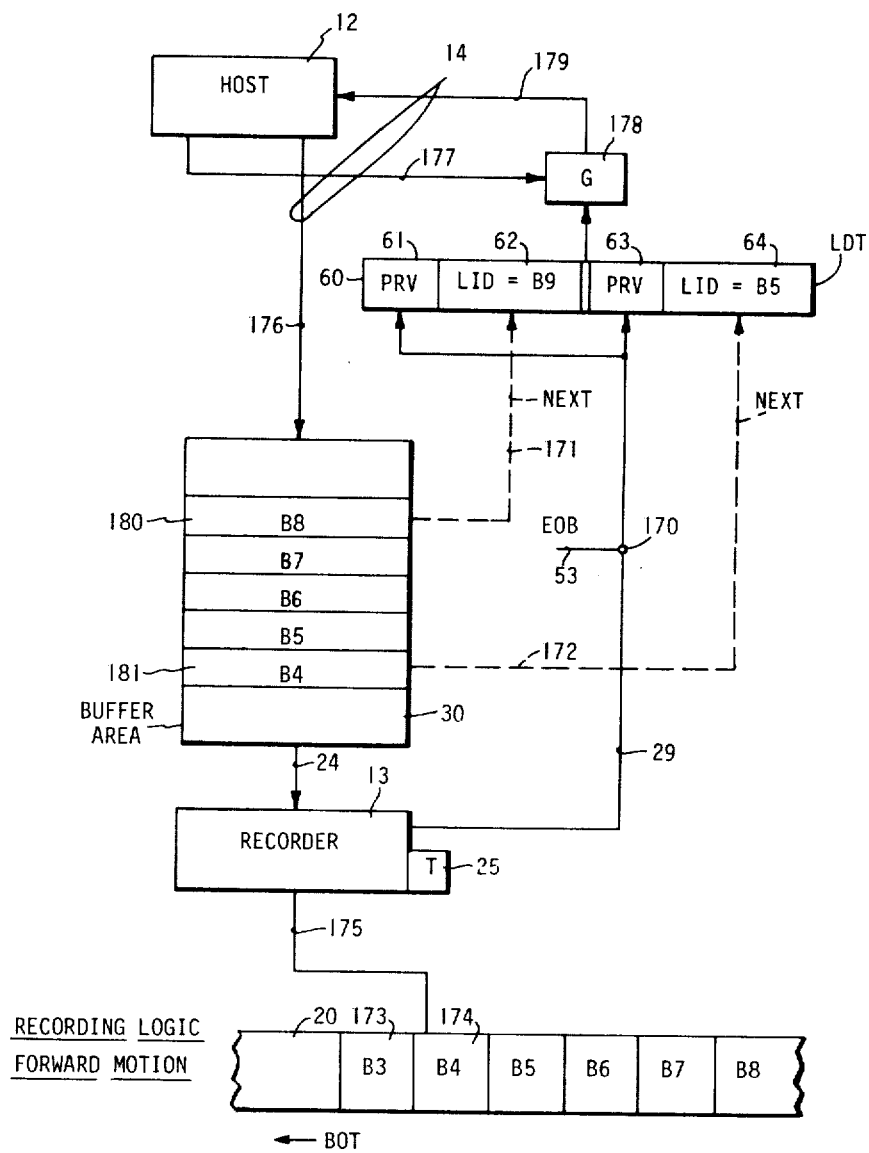
FIG. 5 is a diagrammatic showing of recording logic for recording blocks of signals in accordance with the present invention.

FIGS. 5-8 illustrate broad operational aspects of a storage subsystem when using the principles of the present invention. FIG. 5 illustrates the status of the FIG. 2 storage subsystem when a tape record member 20 is being transported in the forward direction; i.e., tape is moving past transducers 23 so as to move BOT further from transducers 23. The description is first given in terms of a recording operation; i.e., signals are being transferred from a host 12 through buffer area 30 and recorder 13 to tape record member 20. Host 12 transfers blocks of signals to be recorded indicated by bus 176 of input/output channel 14. The data is received by buffer area 30 and stored as blocks of signals designated in FIG. 5 as B4 through B8 in buffer area 30. The lowest block B4 in area 30 is the first received from host 12. The next block to be recorded on record member 20 is B4. The block of signals B3 having already been recorded and has been removed from buffer area 30. Block B3 is recorded in tape area 173, area 174 is designated for receiving block of signals B4 while the remaining blocks B5-B8 are designated in tape 20 but not yet recorded. Block of signals B8 was the last received from host 12. The identification signals have already been recorded in buffer area 30 for the blocks B4 through B8. This fact is reflected in LDT 60 as indicated by dash line 171 extending to the channel logical ID portion 62 which contains number B9 which is the next block of signal to be encountered from the host 12 view in a forward direction motion of tape record member 20. In a similar manner, the fact that block B4 is still resident in buffer area 30 is shown in LDT 60 device logical identification portion 64. The operational connection from buffer 15 to LDT 60 is indicated by dash line 172; that is, block B4 is the next block to be recorded on tape record member 20 or the next block to be encountered during a forward motion of tape record member 20.

The physical reference value PRV contained in portions 61 and 63 of LDT 60 is generated by tachometer T25 of recorder 13 and transmitted over TLI 29 to both portions 61 and 63. Logical AND gate 170 is enabled by the EOB signal of line 53 to gate the PRV to both portions. This gating arrangement occurs not only for the recording operation but also during readback operations; that is, the PRV signal recorded on tape record member 20 is not processed during readback, but is independently generated. The physical transport of tape record member 20 by recorder 13 is indicated by solid line 175.

Transferring the contents of LDT 60 for the illustrated recorder 13 to host 12 is via a channel command transmitted by host 12 over input/output channel 14 to control unit 11. This action is signified in FIG. 5 by line 177 indicating a "read identification" channel command which actuates gating logic 178 to transmit the signal contents of the illustrated register (addressed by device address) of LDT 60 over input bus 179 to host 12.

The buffer area 30 operation for the recording sequence shows that block B4 in area 181 was the first received from the host 12 and is the next one to be recorded while B8 in area 180 was the last received from host 12 and will be the last recorded on tape record medium 20. In a read forward operation, the sequence of blocks is reversed; that is, the first block of signals read from tape 20 and resident in buffer 15 will be an area 180 while the last block of signals read from tape 20 will be an area 181, for example. This sequence is illustrated in the table RF below.

TABLE RF

| Buffer 15 | | LDT 60 | |
|---|---|---|---|
| First | Last | LDEVID62 | LDELID64 |
| B1 | B1 | B1 | B2 |
| B2 | B4 | B2 | B5 |
| B4 | B8 | B4 | B9 |

The first line of the table above shows that one block B1 has been read from tape 20 into buffer 15. It is the first and last block of signals in buffer 15. The LCNLID 62 is B1 which to host 12 indicates that the next block of signals to be acquired from the storage subsystem is block B1. LDEVID 64 is B2 which indicates that the next block of signals to be transferred from tape 20 to buffer 15 is B2. In the second line, host 12 has already acquired B1 from buffer 15. Accordingly, LCNLID 62 becomes B2 and B2 is the first read block of signals currently resident in buffer 15. When B1 was read by host 12, it was erased from the buffer. In the meantime, additional blocks of data have been read from tape record member 20 with the last one read being B4. This makes LDEVID 64 equal to B5. In the third line of the table, blocks B2 and B3 have been read by host 12 from buffer 15 making the first read block of signals currently resident in buffer 15 as B4. The last read one is B8. It will be noted that this is the same set of blocks of signals in buffer 15 as indicated in FIG. 5 for a recording operation; however, B4 will be in area 180 while B8 will be in area 181, LDEVID 62 is B4 while LDELID 64 is B9. From this, it can be seen that the order of blocks in the buffer 15 or the buffer area 30 reflects the order of the blocks on the tape 20 together with the direction of tape transfer between the host 12 and tape record member 20 as well as direction of motion of the tape record member 20.

Figure 6:
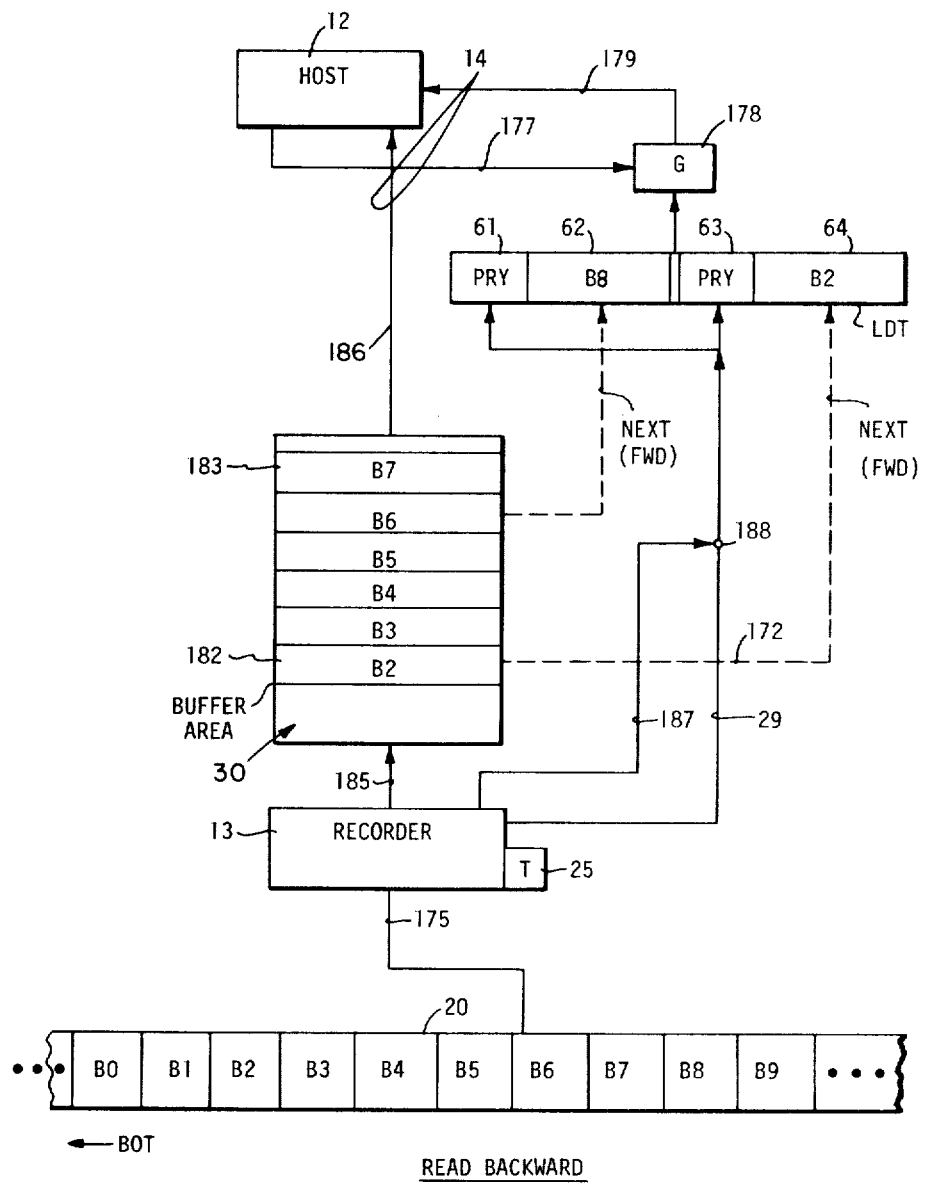
FIG. 6 is a diagrammatic showing of the control of a storage subsystem during a readbackward operation.

FIG. 6 illustrates the same subsystem of FIG. 5 but for a read backward operation. Blocks B0-B9 are shown on tape record member 20 with the tape being transported in the backward direction, toward beginning of tape. Accordingly, the higher numbered blocks are first encountered by recorder 13 transducer 23 and therefore the sequence of blocks resident in the buffer area 30 is in ascending order from area 182 to 183 and corresponds to the same numerical sequence for recording signals, as shown in FIG. 5. Numeral 185 indicates signal transfers from recorder 13 to buffer area 30 while numeral 186 signifies the BUS IN portion of input/output channel 14 for transferring signals from buffer area 30 to host 12.

During readback operations (forward and reverse), recorder 13 signifies to the control unit that an end of block has occurred. Line 187 carries the EOB signal from recorder 13 to AND gate 188 which gates the TLI signal on bus 29 to the PRV portions 61, 63 of LDT 60. LCNLID portion 62 contains the identification of the next block to be encountered on tape record member 20 in the forward direction. Remember that tape is being transported in the reverse direction. Accordingly, the block of signals B7 in area 183, the first read block of signals, is next adjacent to block of signals B8 which is just forward. Therefore, the value in LCNLID 62 identifies the block of signals just read by host 12. In a similar manner, block B2 in area 182 was just read from tape record member 20. However, since reading is in the *backward* direction, the LDEVID 64 area of LDT 60 will contain identification signals for block B2 because the next encountered block in the *forward* direction of tape motion is the block last read into buffer area 30.

The purpose of using this same frame of reference irrespective of direction of tape transport is that all error recovery and record identification procedures can be based upon this one single relationship between LDT 60 and the contents of buffer area 30 for each of the devices 13. Making the identifications independent of tape motion direction is essential for ease of repeatable calculations.

Figure 7:
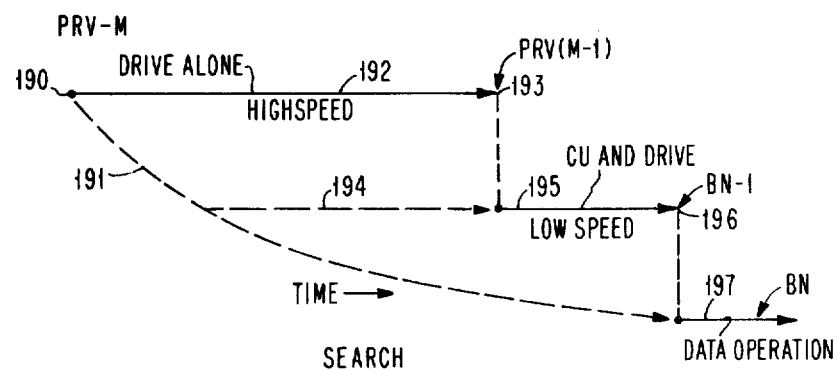
FIG. 7 is a timing diagram showing a search or locate sequence of operations.

FIG. 7 shows the sequence of a typical locate or search operation commanded by a host 12 using the identification signals of the present invention. At 190, the host 12 has supplied a locate command signal to a control unit 11 for locating a block of signals previously recorded in sector PRV-M (FIG. 1) and block "BN" 40. At 190, the control unit 11 determines the exact present location of tape record member 20 within a device 13. If the present physical location is in PRV-M, then a high speed motion is aborted with dash line 191 indicating that the relative tape location is at BN-1; therefore, a data operation at 197 for BN 40 can occur immediately. If the tape record member 20 is not in PRV-M, the high speed motion 192 is activated; that is, device 13 moves tape record member 20 at high speeds using the tachometer 25 to identify PRV(M-1). When PRV(M-1) is reached, as at 193, the device 13 signals the control unit 11 that the tape has been properly positioned. Control unit 11 at 195 continues the tape motion by reading successive identification signals at normal recording speeds. In this regard, tape record member 20 may have already been located at PRV(M-1) with the low speed search beginning as indicated dash line 194. When block BN-1 is reached, as at 196, device 13 stops the tape 20 and signals control unit 11. Control unit 11 then signals host 12 that a data processing operation on block BN may occur. Host 12 then signals control unit 11 to begin a read or write operation 197 on block BN 40.

Figure 8:
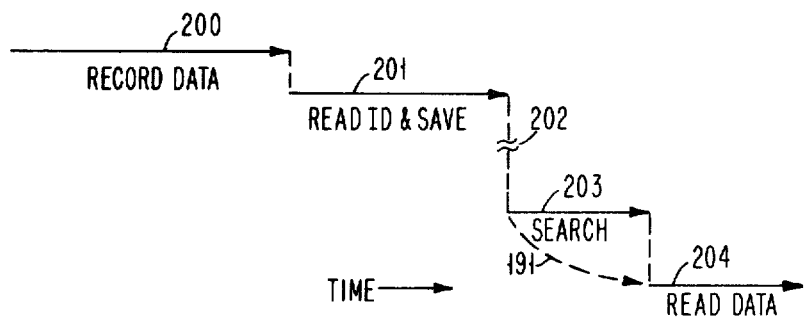
FIG. 8 is a logical diagram showing a data processing sequence with a storage subsystem employing the present invention.

FIG. 8 gives a broader overview of the use of the identification signals in a data processing operation. At 200, the data is recorded on tape record member 20 which includes the identification signals. At 201, host 12 reads the subsystem assigned identification signals and saves the same within its process or other data structure. The tape record member 20 identified as a record volume is removed from the device 13 and stored as indicated at 202. At some later time, the record volume is mounted on a device 13 (not necessarily the device which recorded the data). A locate or search operation occurs at 203; however, if the tape motion prior to the locate command had moved the tape record member 20 to block BN-1, then the operation proceeds along dash line 191 directly to the read data operation 204. Otherwise, the read data operation 204 follows completion of search 203.

Figure 9:
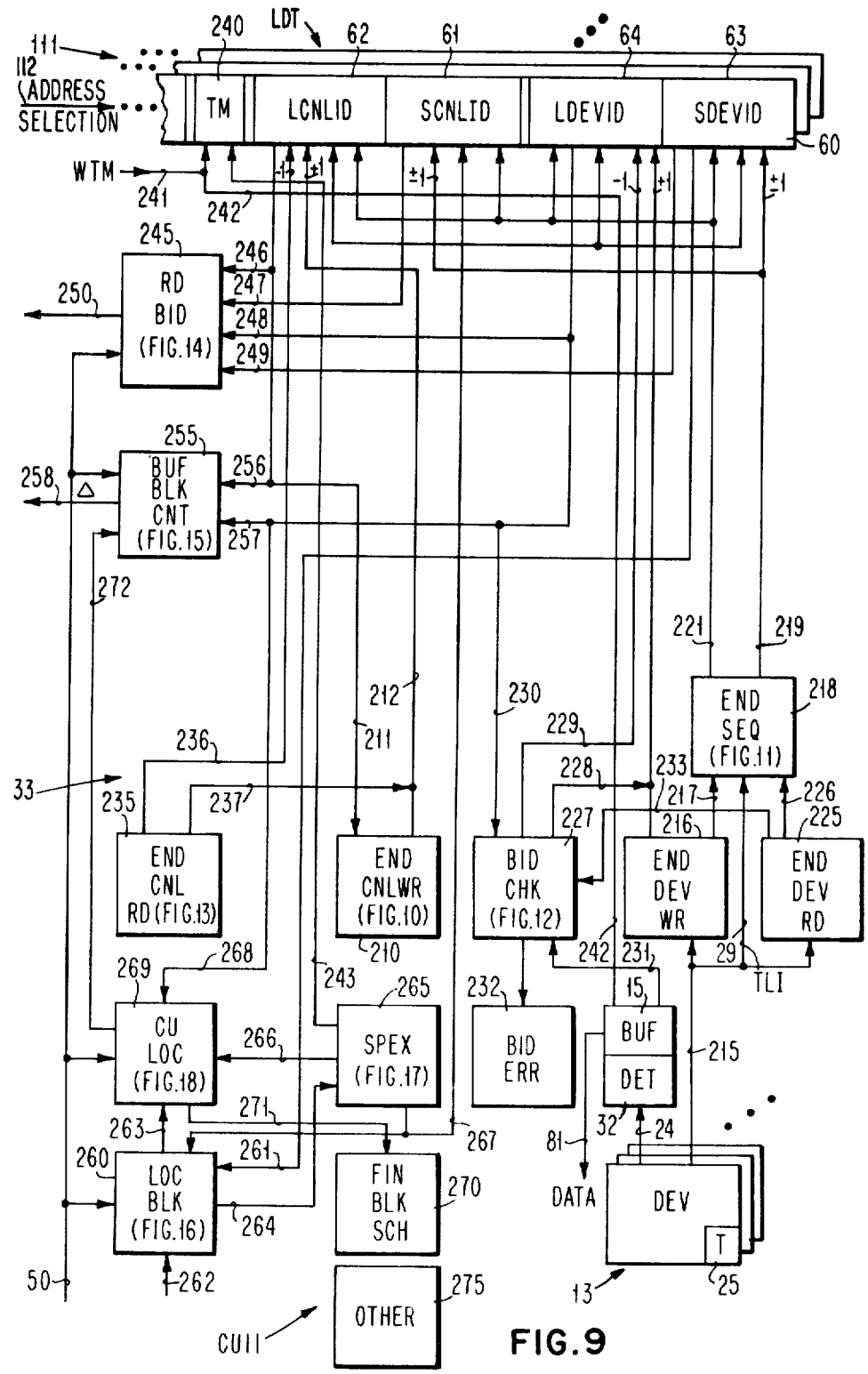
FIG. 9 is a diagrammatic showing of one implementation of the present invention.

FIG. 9 illustrates the usage of LDT 60 by the illustrated microcode modules for implementing the invention in the FIG. 2 illustrated storage subsystem. LDT 60 contains a plurality of addressable registers which are addressible based upon the device addresses translated by the microprocessor 110 into control store 111. Register addresses are indicated by address selection arrow 112. For example, device D1 can have register address FF10 while D2 can have register address FF20, etc. The description of FIG. 9 assumes that one and only one of the registers LDT 60 has been addressed and that all operations are with a given device 13.

First, the generation and the assignment of the logical portion of the identification signal during a recording operation is described. A host 12 has transferred a block of signals to buffer 15. Host 12 supplies the COMMAND OUT signal indicating the end of block (See FIG. 1). This COMMAND OUT signal during a recording operation activates the END CNLWR module 210, as later detailed. The execution of END CNLWR 210 by microprocessor 110 (FIG. 3) results in the LCNLID 62 being incremented by +1. Remember that in a recording operation, LCNLID 62 contains the block logical identification of the next block of signals to be transferred from host 12 to buffer 15. Accordingly, the original value in LCNLID 62 identifies the block of signals being received from host 12. Incrementing LCNLID 62 at the end of a signal transfer prepares LDT 60 for transfer of the next succeeding block of signals from host 12. Prior to this incrementation, microprocessor 110 had sensed the LCNLID logical portion 62 and transferred the previous contents to buffer 15, as indicated by numeral 211 of FIG. 9. Accordingly, LDT 60 is the memory space for LCNLID which is incremented by microprocessor 110 in response to a write or record command from host 12.

The physical reference value is generated identically for recording operations as for a readback operation. Device 13 with tachometer 25 supplies signals over bus 215 to the control unit 11 and thence control 33. Part of bus 215 carries TLI 29 which, as later described, increments the SCNLID 61 and the SDEVID 63 of LDT 60. Control unit 11 terminates the writing of the block of signals to a device 13 when buffer 15 has supplied the last byte of data. This function is well known and performed via module END DEVWR 216 which resides in the CUDB 156 group of microcode. Since the function is well known, it is not described. One of the functions performed by END DEVWR 216 is to call END SEQ 218 via line 217. END SEQ 218 is in the CUDI 157 microcode group and controls the termination of control between a device 13 and control unit 13. Such termination follows general practice, such as stopping the movement of tape record member 20. In connection with practicing the present invention, END SEQ 218 increments or decrements the PRV value of LDT 60 for the given device; for a forward tape motion, the PRV value is incremented; for a backward tape motion, the PRV value is decremented. This action is signified by the line 219 extending to portions 61 and 63 of LDT 60. END SEQ 218 alters the PRV value only upon the end of a data processing operation. Accordingly, it will be noted that during a later described LOCATE command, host 12 will supply the value of the PRV to SCNLID 61. The SDEVID in portion 63 can also be supplied by the LOCATE command and altered later by END SEQ 218 as well as the later described microcode modules; therefore, the function of ENDSEQ 218 is to update the PRV values but not to initialize them. Device 13 also senses when the physical location of tape record member 20 is at BOT. This fact is signaled to ENDSEQ 218 resulting in a reset signal being supplied over path 221 to both portions 61 and 63 of LDT 60 for resetting the PRV value corresponding to the BOT reference numeral.

Next described is a readback operation and implementation of the invention within control unit 11 during such a function. It is assumed that the microcode responsive to a READ command has already caused the device 13 to supply signals sensed from tape record member 20 to buffer 15. The end of block (EOB) is identified by device 13 to result in activation of microcode module ENDDEVRD 225 which is in the CUDB 156 group of microcode. The functions performed by ENDDEVRD 225 is similar to the ENDDEVWR 216 except that the forward or backward motions of the tape record member 20 is accommodated. Module 225 calls END SEQ 218 via path 226 for ending the data transfer operation from device 13 to buffer 15. At this time, it is not known whether the identification signals recorded on tape record member 20 with the data block transferred into buffer 15 have been successfully read from tape 20. Correctness of the identification signals is essential to accurately alter LDT 60. Accordingly, ENDDEVRD 225 calls a verification microcode module BIDCHK 227 via path 233. BIDCHK 227 is in the CUDB 156 group of microcode. BIDCHK 227 increments or decrements the LDEVID 64 portion respectively over paths 228 or 229 only after verifying that the sequence of identification signals is appropriate. To this end, BIDCHK 227 receives the previous contents of LDEVID 64 over path 230. BIDCHK 227 then compares the present value with the value read from tape record member 20. If the difference is appropriate for the sequence of logical identification signals for a succession of blocks of signals, it then and only then increments or decrements portion 64 of LDT 60. If the sequence is inappropriate, then BIDCHK 227 calls error recovery microcode module BID ERR 232 which is in the CUER 159 microcode group. BIDERR 232 enables microprocessor 110 to effect recovery procedures for trying to obtain a correct readback. In the event a correct readback is not obtained, then the portion 64 is updated to the then readback value and an error condition is signaled to host 12 for recovery procedures beyond the scope of the present description. Therefore, it is shown how the logical and physical values of the device portion of the identification signals of LDT 60 have been altered. The logical portion 62 of the channel set of identification signals of LDT 60 is updated upon the completion of each successful transfer of a block of signals from buffer 15 to host 12. It is understood that channel adapters 80 and microprocessor 110 have coordinated the startup and transfer of a block of signals from buffer 15 to host 12 in response to a read command signal. When buffer 15 has supplied the last byte of data, which excludes the identification signals stored in buffer 15 with that block of signals, to channel adapters 80 for transmission to host 12, the microcode module ENDCNLRD 235 is activated. Module 235 is in the CUCB 151 group of microcode. Depending upon the relative direction of motion of tape record member 20, ENDCNLRD 235 will increment the LCNLID 62 by 1 for a forward tape motion or decrement it one for a reverse or backward tape motion respectively indicated by the paths 237 and 236. Again, the initialization of LCNLID 62 is by a read command supplying the desired block through the located function which will be described later. The ENDCNLRD module 235 only updates portion 62 during its succession of reads in a so-called CCW chain of operations.

A tape mark TM can be written on tape record member 20 and therefore can be sensed from tape record member 20 as well. TM is a control block for signifying file demarcations in tape storage subsystems. LDT 60 has a bit position in each of the registers for each of the respective devices 13 for storing whether or not a tape mark is being written or has been read. Bit 240 is set to the active condition in response to a host 12 supplying a write tape mark command WTM as indicated by path 241 wherein readback operations to tape mark is signified by a particular pattern of signals and detected by detector 32 (also referred to as a recording circuits 32) which is lodged in buffer 15. Buffer 15 signifies the detected tape mark over path 242 which results in setting bit 240 to the active condition. Bit 240 is reset by a signal carried over path 243 as well as other paths not described in the present specification and not necessary to an understanding of the present invention. The signal patterns representing the tape mark are never transmitted to a host 12 but automatically erased from buffer 15 via controls 33.

The next operation described with respect to LDT 60 of FIG. 9 is transferring the identification signals from a register of LDT 60 to host 12. Such transfer occurs in the illustrative embodiment only in response to a channel command from host 12 commanding such transference of identification signals. Such command is executed in the CUCE group 152 by module RDBID 245. The performance of the program of RDBID 245 by microprocessor 110 corresponds to the logic gate function 178 of FIGS. 5 and 6. Module RDBID 245 merely receives the signal contents of the addressed LDT 60 registers from portions 61-64 over paths 246, 247, 248 and 249 and transmits same over I/O channel 14 to host 12 as indicated by path 250. Path 250 corresponds favorably to bus 179 of FIGS. 5 and 6 and physically occurs on the bus in for host 12. The command to read LDT 60 from host 12 is represented by line 50 going to RDBID 245 for actuating same.

It is useful to compare the identification signal for determining the number of data blocks in a data area 30 for given ones of the devices 13. Such comparison can have plural usages as will be later described. Because of plural usages, BUF BLK CNT module 255 is in the CUBM 150 group of microcode. The module 255 causes microprocessor 110 to receive the signal contents of both the logical ID portions 62 and 64, respectively, over paths 256 and 257. Module 255 enables microprocessor 110 to compare the numerical values represented by the signals in these two logical portions and outputs the difference between the signal values over path 258 which is an accurate representation of the number of blocks read from tape 20 and not yet transmitted to host 12 or the number of blocks transmitted to buffer 15 by host 12 and not yet recorded on tape 20. It should be noted that this includes control blocks as well as data blocks.

Host 12 can command the subsystem to locate a block of data on a record volume that was recorded and in which the host 12 has the identification signals for the logical and physical attributes of that block of signals. The locate or search function is shown in FIG. 7 and in FIG. 9 is implemented by the locate block LOCBLK 260 microcode module of the CUCE 152 program group. The command received over line 50 for locating a designated block will include both the logical and sector (PRV) identification signals. The module LOCBLK 260 fetches the SDEVID from portion 63 of LDT 60 for the given device and compares it with the target sector received with the locate command from host 12 via DIA 139, as represented by arrow 262. When the comparison of the target sector is close to the actual device sector, then module CULOC 269 is activated via path 263. This action corresponds to the dash line 194 of FIG. 7. Otherwise, LOCBLK 260 enables microprocessor 110 to order the device 13 to move the tape record member 20 to a destination block M-1 where M is the target sector. Moving tape based upon tachometer sensing is well known and is not further described for that reason. When the drive has reached the ordered M-1 physical position, corresponding to point 193 of FIG. 7, a special execution module SPEX 265 is called via path 264. SPEX performs checking functions and determines if M-1 has actually been reached. At M-1, CULOC 269 is called via path 266 for continuing the search represented by numeral 195 of FIG. 7. SPEX 265 also responds to drive reporting that tape BOT is adjacent to transducer station 23 to reset all portions 61–64 of LDT 60 pertaining to the given device 13. This path 267 also extends to LOCBLK 260 for indicating BOT to that module.

For CULOC 269 to do a search based upon the logical portion of the identification signals requires the receipt of the LDEVID from portion 64 over path 268. In the event that the locate function of device 13 supervised by CULOC 269 does not result in comparison between the LDEVID of portion 64, the target identification then FINBLKSCH 270 is called via path 271 for error recovery purposes. Error recovery is beyond the scope of the present description. It should be noted that in the CULOC 269 the searching or locating is achieved by the device searching reading all of the signals recorded on the tape including the identification signals. These signals are supplied and stored in buffer 15 with the data being discarded and the identification signals being supplied to the device set of the LDT 60 for both the sector and logical portions 63 and 64. Accordingly, the CULOC 269 results in the device set of identification signals accurately tracking the location of the tape. Also note that the first block of signals recorded on tape that is traversed by transducing station 23 results in updating of portion 64 to the current PRV.

Numeral 275 represents the other microcode modules not shown in FIG. 9 but which are resident in control store 111 for providing a complete tape storage subsystem control; the present description detailing only those portions of control that are pertinent to the subject matter of the present invention. Also, all tape operations can be made to begin from BOT; therefore, the LDT 60 entries for the address device can always be reset with the locate command updating the device set of identification signals in portions 63 and 64, the updating of the PRV in portion 63 also results in the updating of the PRV in portion 61. When tape operations begin in the middle of a tape, then the commanded read or recording operation contains the identification signals identifying the first block of signals to be transferred between the host 12 and tape record member 20. Such controls will result in the LDT 60 appropriately addressed registers to be loaded with those numerical values. All of this will become more apparent with the continued reading of the present description.

Figure 10:
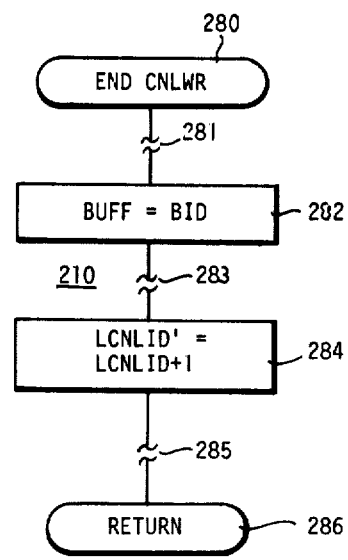
FIG. 10 is a logic flow diagram showing assignments of the logical portion of identification signals in accordance with the present invention.
Figure 11:
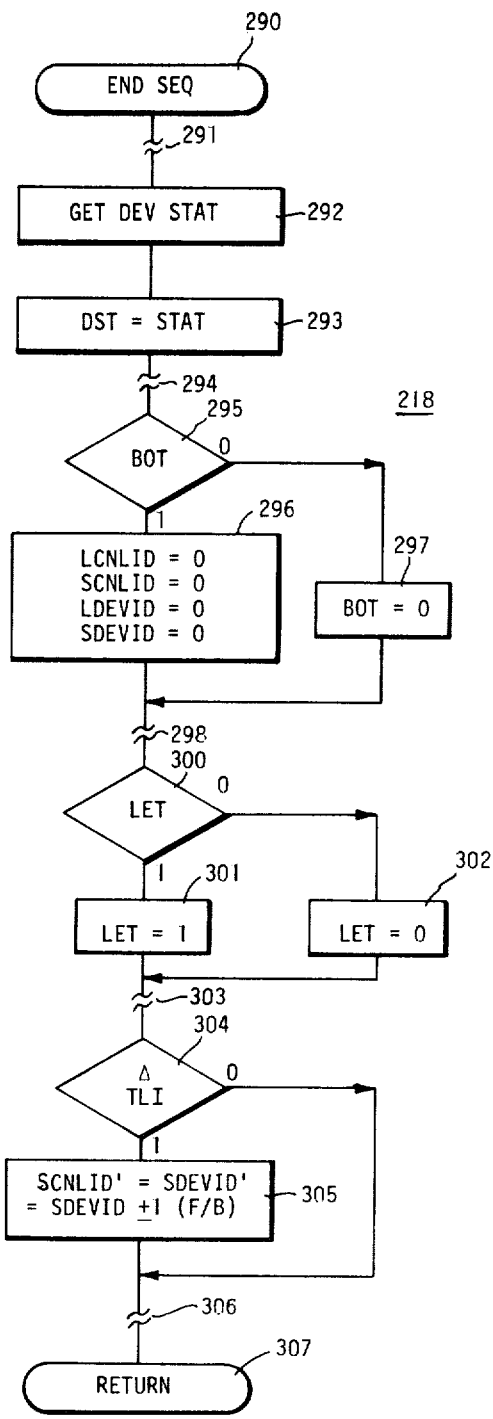
FIG. 11 is a logic flow diagram showing the assignment of a physical reference value generated by a storage apparatus and assigned to a block of signals in accordance with the present invention.

FIGS. 10 and 11 illustrate the detailed logic flow for creating the logical and physical identification signals during a recording operation as also shown in FIGS. 1 and 5. Both the logical and physical portions of the identification signals are generated. In general, the logical portion is the subsystem response to host 12 I/O channel 14 activity while the physical portion relates to device activity. The recording operation is controlled in the control unit 11 through the CUCB 151 group. The description of FIG. 10 assumes that the transfer of signals has been completed for at least one block of signals from host 12 to buffer 15. At that time, the END CNLWR module 210 is called at 280. Because of the complexity of transferring data in a reliable manner, non-pertinent microcode is executed at 281. Such non-pertinent microcode includes address generation for generating the address on address bus 112 for control store 111. Also certain control flags such as a channel transfer active flag, checking for error conditions and the like are handled. Then at step 282, microprocessor 110 stores the signal contents of the channel set of identification signals of LDT 60 portions 61 and 62 in buffer 15 area 30 immediately adjacent the data block 40, as shown in FIG. 1. Following storing the identification signals, other non-pertinent code is executed at 283. Finally at 284, which follows substantial error checking and verification procedures, the logical portion of the channel set of identification signals is updated. The updating in the preferred embodiment is merely incrementing the numerical content of LCNLID by unity. Following incrementation, other non-pertinent code is executed at 285 and the program returns at 286 to IDLE SCAN for enabling microprocessor 110 to perform other functions.

FIG. 11 illustrates the logic flow of END SEQ 218 in the CUDI 157 group. During a recording operation, transfer of signals from buffer 15 to tape 20 is ended when the last byte leaves buffer 15, the END DEVWR module 216 is called for generating the PRV. It is remembered that the PRV is generated identically during both recording and readback. Accordingly, a detailed description will only address PRV generation during recording. END SEQ 218 is entered at 290 and certain non-pertinent code is executed at 291. Such code relates to the control of tag signals exchanged between a device 13 and a control unit 11 necessary for the termination of recording a block of signals. Such tags may indicate that the tape 20 must be continuously transported such that a next subsequent block of signals can be recorded without intermediate tape stoppage. At 292, microprocessor 110 obtains the device status as device 13 reported it to the control unit. The status of the addressed device 13 is then stored in DST 140 at step 293. Following status reporting, certain error checking occurs at 294 which is not further described because it is not pertinent to an understanding of the present invention. Whether or not the tape is at BOT is checked at 295, the BOT indicators are obtained from DST 140. If BOT is not reached, then at 297, BOT flag is reset to zero. Such flag can be in DIA 139. If BOT has been reached, then at 296, the portions 61–64 of LDT 60 appertaining to the addressed device are all reset to a BOT reference value. The reference value can be non-zero; the zeroes in block 296 signify such a reference value. Following this action, microprocessor 110 executes non-pertinent code at 298. Finally, at 300, microprocessor 110 checks for the logical end of tape (LET). This information supplied by device 13 results in action at 301 or 302 for setting a LET flag to 1 or 0, such flag being in DST 140. Further non-pertinent code is executed at 303. At 304, microprocessor 110 determines whether or not a change in the tape length indicator TLI has occurred as reported by the addressed device. If no change has occurred, PRV in LDT 60 is not updated. Otherwise, PRV is updated by plus or minus 1 at 305 dependent upon the direction of motion, forward or backward, of tape record member 20. This action corresponds to path 219 of FIG. 9. Following this action, non-pertinent code is executed at 306 and the return to the IDLE SCAN routine is at 307.

Figure 12:
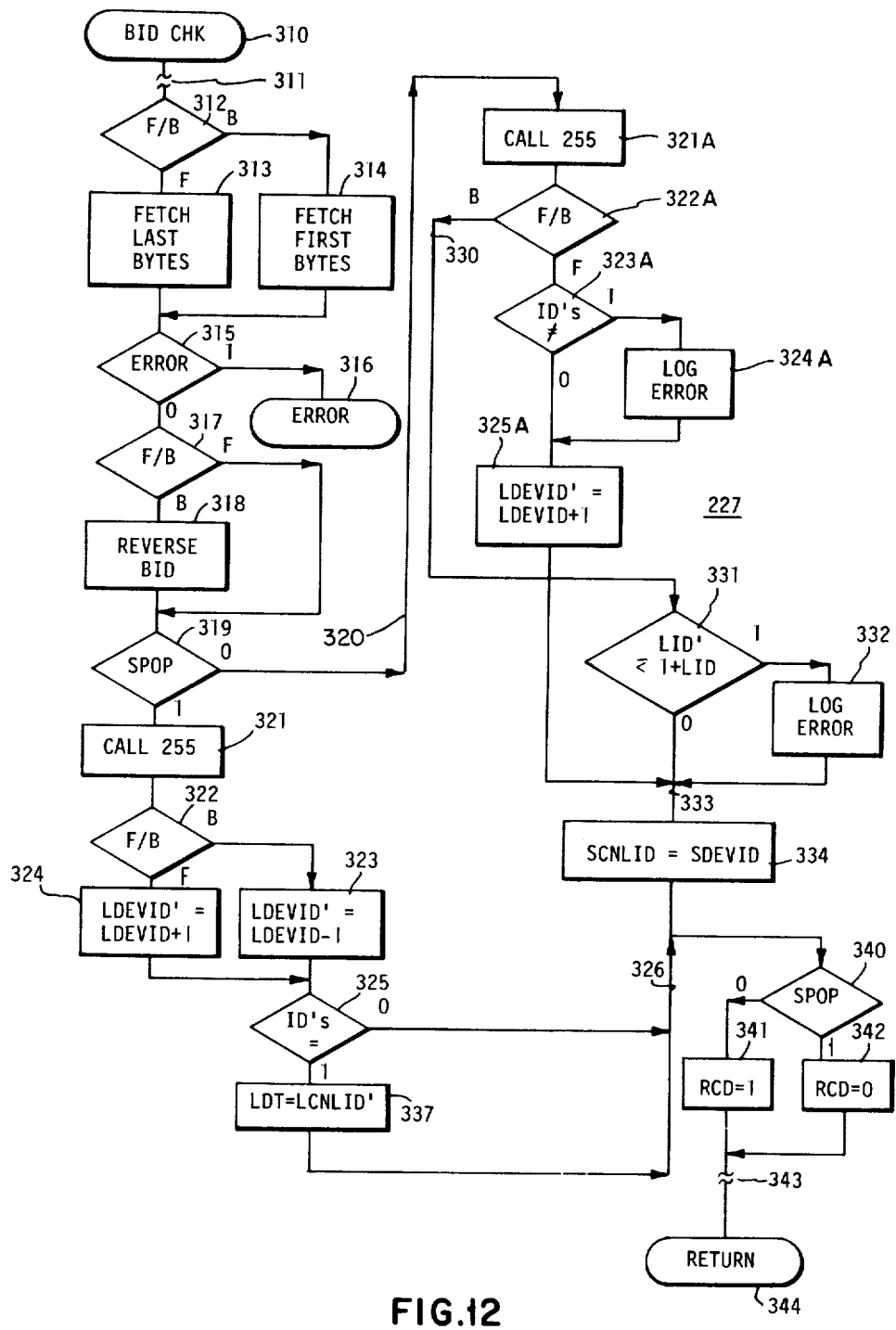
FIG. 12 is a logic flow diagram of a checking sequence for verifying continuity of the logical portion between the succession of blocks of signals read from a record medium.

Next the incrementation of LDEVID in portion 64 is described by detailed description of BID CHK 227. It will be remembered from FIG. 9 that the identification signals read from tape 20 are supplied for checking as indicated by path 231 and are compared with the signal contents of portion 64 as indicated by path 230. The action of BID CHK 227 occurs only after detector 32 has appropriately error-detected and corrected the read-back identification signals. Also, END DEVRD 225 has been executed and called BID CHK 227 via path 233. This call is indicated in FIG. 12 by numeral 310. Certain non-pertinent code is executed at 311 with the forward/backward flag (SDT 132) for indicating direction of tape 20 motion being checked at 312. At this point, micro-processor 110 fetches the identification signals read from tape as stored in buffer 15 and as represented by path 231 (FIG. 9). If the tape motion is in the forward direction, then the identification signals are at the higher address registers of buffer 15 area 30; i.e., identification signals are at the so-called "EOT end" of the data block as shown in FIG. 1. Accordingly, the last bytes of the buffer area 30 are fetched at 313. On the other hand in a readbackward operation, the identification signals are the first signals encountered and are therefore located at the lowered numbered registers of buffer 15 area 30 which is regarded as the "BOT end". Therefore at 314, microprocessor 110 fetches the first bytes which are the identification signals read from tape 20 in the backward mode. In any event, these bytes are stored in local store 114. At 315, microprocessor 110 checks for an error condition. If there is an error condition, an error exit 316 is executed for invoking error recovery procedures beyond the scope of the present disclosure; that is, the signals read from buffer 15 are inaccurate because of certain errors. Assuming that there is no error, then at 317, microprocessor 110 again checks the forward/backward flag (SDT 132). If the tape is moving forward, then the order of bytes in the identification signals are in the appropriate order. In a read-backwards read, they are in a reversed order; accordingly at 318, the order of bytes in the identification signals are reversed such that there can be a one-for-one comparison with the corresponding signals in the device set of identification signals in portions 63 and 64 of LDT 60.

At 319, microprocessor 110 determines whether or not the tape motion was in response to a read command or in response to a space operation (SPOP). A space operation merely moves the tape over a block of recorded signals for repositioning it for subsequent data processing operations or in connection with a locate function such as performed by CULOC 269 as well as for determining where the tape is positioned as executed in SPEX 265. If it is not an SPOP, then path 320 is followed for executing later described functions. On the other hand, if it is an SPOP, then module 255 (buffer block count) is called at 321. Module 255 will do a comparison between the LDEVID of portion 64 and the corresponding LDEVID read from tape (for LOCATE command) with the difference being reported through path 258 of FIG. 9 and as later described with respect to FIG. 15. Module 255 returns to the FIG. 12 illustrated logic flow at 322 wherein microprocessor 110 again checks the forward/backward flag (SDT 132). If tape motion is in the forward direction, the contents of portion 64 are incremented at 324; while in the backward direction, the contents of portion 64 are decremented at 323. Following either one of these actions, microprocessor 110 at 325 compares the just incremented or decremented portion 64 to determine whether or not equality exists between the logical portion of the identification signal read from tape 20 and the tally kept in LDT 60 as incremented/decremented. If they are equal, then the contents of portion 64 is made equal to the new value of LCNLID termed LCNLID'. If the ID's are not equal, LDT 60 is not incremented because of a possible sequence error condition. Microprocessor follows path 326 from branch 327 for checking at 340 for an SPOP. Such will alter the error recovery procedures. If it is an SPOP, there is no record to be kept in buffer 15; therefore, RCD (record) is reset at 342 or is set at 341 when the operation is not an SPOP. The RCD flag is in BCT 145 and has one flag for each addressable device 13. Non-pertinent code 343 includes calling BID ERR module 232 and is not described for that reason. The microprocessor 110 returns to the IDLE SCAN at 344.

At 319, when a record is being processed (SPOP=0), path 320 leads microprocessor 110 to call logic module BUF BLK CNT 255 at 321A. Upon completing the buffer block count function, microprocessor 110 at 322A checks the direction of tape transport (F/B in SDT 132). When tape motion is the forward direction F, at 323A the block ID of portion 64 is compared with the block ID received from recorder 13. If the two IDs are unequal, an error has occurred and is logged at 324A in the usual manner. When the IDs are equal, proper procedure is occurring; then and after logging the error, the contents of portion 64 of LDT 60 are incremented at 325A. Then at 334, reached via logic path 333, SCNLID of portion 61 in LDT 60 is made equal to SDEVID of portion 63 of LDT 60. The previously described steps 340-344 are then performed. For backward tape motion B at 322A, logic path 330 leads microprocessor 110 to step 331 for comparing the new value of LID (LID') with one plus the current or old value of LID. If LID' is equal to or less than LID', an error is logged at 333 and path 333 is followed. (LID' should be greater than LID+1). For the other condition at 331, path 333 is followed to the previously described step 334.

Figure 13:
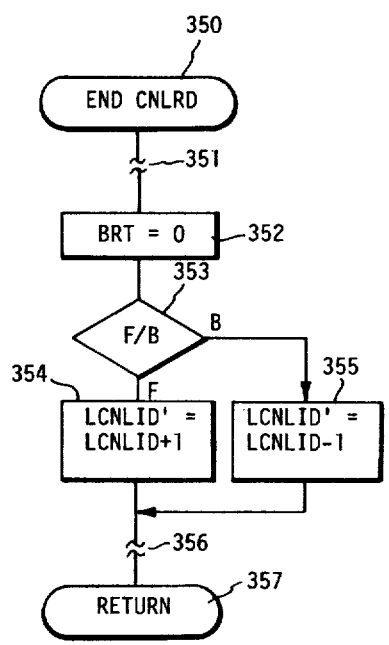
FIG. 13 is a logic flow diagram showing incrementations of a logical portion of block identification signals during a readback operation.

In connection with the sequence error, the block of data just read can be reread to see of the sequence error can be remedied; otherwise, more extensive error recovery procedures may be invoked. FIG. 13 illustrates the detailed logic flow for incrementing or decrementing the LCNLID value in portion 62 of LDT 60. It is assumed that data signals having been transferred from buffer 15 to host 12. Upon completion of transfer of each block of such signals, which corresponds to transference of the last byte of a block from buffer 15 to a channel adapter 80 results in module END CNLRD 235 being called. The call is represented in FIG. 13 at 350. As is usual, a lot of functions have to be performed with respect to I/O channel 14 at the end of each block of signal transfer and this is indicated at 351. Among other things, the BRT 141 had an entry identifying a block of signals just transferred to host 12. This entry is erased at 352. Then at 353, microprocessor 110 checks the direction of tape motion (SDT 132). If motion is in the forward direction, LCNLID portion 62 is incremented at 354 while when tape 20 is transported in a backward direction (read backwards) LCNLID in 62 is decremented at 355. Other non-pertinent code is executed at 356 with the microprocessor 110 returning to IDLE SCAN at 357.

Figure 14:
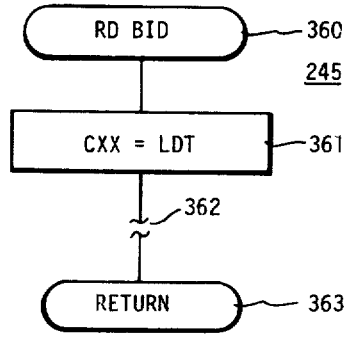
FIG. 14 is a logical flow diagram showing a data source-sink accessing identification signals associated with block signals temporarily stored in a buffer of a storage subsystem.

FIG. 14 details the logic flow for execution of the host 12 command to transfer the contents of LDT 60 pertaining to an addressed device to the requesting host 12. Module 245 is entered at 360 of FIG. 14. At 361 the contents of the addressed LDT 60 register (addressed via bus 112) are transferred to the appropriate channel adapter 80 indicated in FIG. 14 as CXX for one of the eight channel adapters 80 shown in FIG. 2. This transference invokes automatic procedures for transferring that data to host 12. Certain minor non-pertinent code is executed at 362 for indicating the completion of the execution of the received channel command. IDLE SCAN is returned to at 363.

Figure 15:
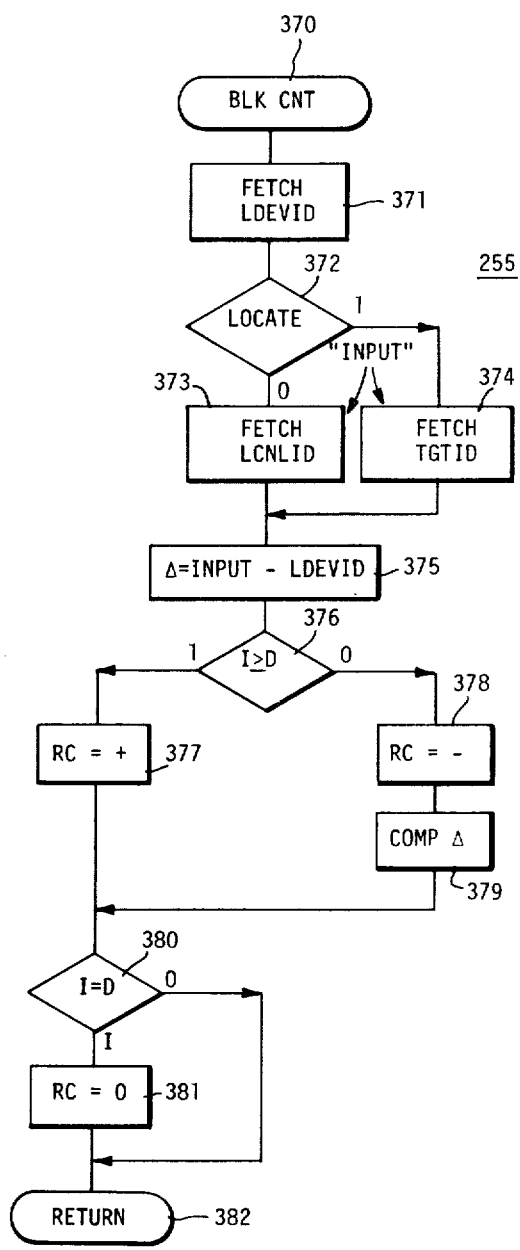
FIG. 15 is a logic flow diagram showing the comparison of a first and second set of block identification signals for determining the signal contents of a data buffer.

FIG. 15 illustrates the logic flow of buffer block count module (BLK CNT) 255. This module provides two different functions. One, it responds to a command from a host 12 for indicating to the requesting host 12 the number of blocks of signals temporarily stored in buffer 15 for any addressed device 13. This action causes module 255 to be in the CUCE microcode grouping. The second utilization of module 255 is in the execution of the LOCATE command when CU LOC 269 is used to determine the number of blocks of signals on tape 20 that separates the present position of the tape with a desired position. In the first instance, the number of blocks of signals in the buffer 15 are reported as an absolute value to the host 12. In the second instance, the differential block count represents the number of blocks on tape 20 intermediate the desired position and the present position of tape 20.

Module 255 is entered at 370 from either executing the command on path 50 or called by CULOC 269 over path 272. At 371, the LDEVID stored in portion 64 of LDT 60 for the addressed device 13 is fetched and put in local store 114. At 372, microprocessor 110 determines whether or not a locate command is being executed; that is, if CULOC 269 called this procedure: if yes the target identification (TGTID) is fetched at 374, the target identification is the set of identification signals for the desired block as identified by host 12 to the storage subsystem 10 in connection with the transmission of a LOCATE command. Such target identification signals are usually stored in DIA 139. On the other hand, if it is not a LOCATE command, then module 255 is responding to a command from host 12 to determine the number of blocks of signals residing in buffer 15 for a particular addressed device 13. In this instance at 373, microprocessor 110 fetches LCNLID from portion 62 of LDT 60. At this point, microprocessor 110 has the present logical position of tape 20 from LDEVID of LDT 60 and an input value which either is the target ID or LCNLID in LDT received via the LOCATE command. At 375, microprocessor 110 determines the difference between the input value and LDEVID. LDEVID is always subtracted from the input value (assumes forward tape motion). At 376, microprocessor 110 determines whether or not the input value was greater than or equal to the device value (actual position of tape 20). If the input value is greater, then the result of the subtraction is positive and therefore the record count is already positive and is stored in local store at 377. On the other hand if the device position has a logical number greater than the input number, then the subtraction result is negative. The negative value indicated at 378 is complemented at 379 in order to make it absolute. A flag indicating that the absolute value provided at 379 resulted from a negative value is set in DIA 139. A review of the previous descriptions, particularly with reference to FIG. 1, will show relative positions of the tape 20 represented by LDEVID and the input values for both positive and negative subtraction results.

Next, microprocessor 110 determines whether or not the input logical value is equal to LDEVID as at 380. If it is equal, then the record count is zero and is noted at 381 by setting a zero flag in DIA 139. If it is not zero, then the calculations performed at 375 and verified in steps 376–379 need not be altered. At this time, all of the information generated by module 255 is in DIA 139 which can be accessed by CULOC 269 or can be transferred to the host 12 using CUCB 151 microcode modules. AT 382, microprocessor 110 returns to the calling module, for example, CULOC 269 in the case of a LOCATE command and to command execution CUCS 155 thence to CUCB 151 for transmitting the data to host 12.

Figure 16:
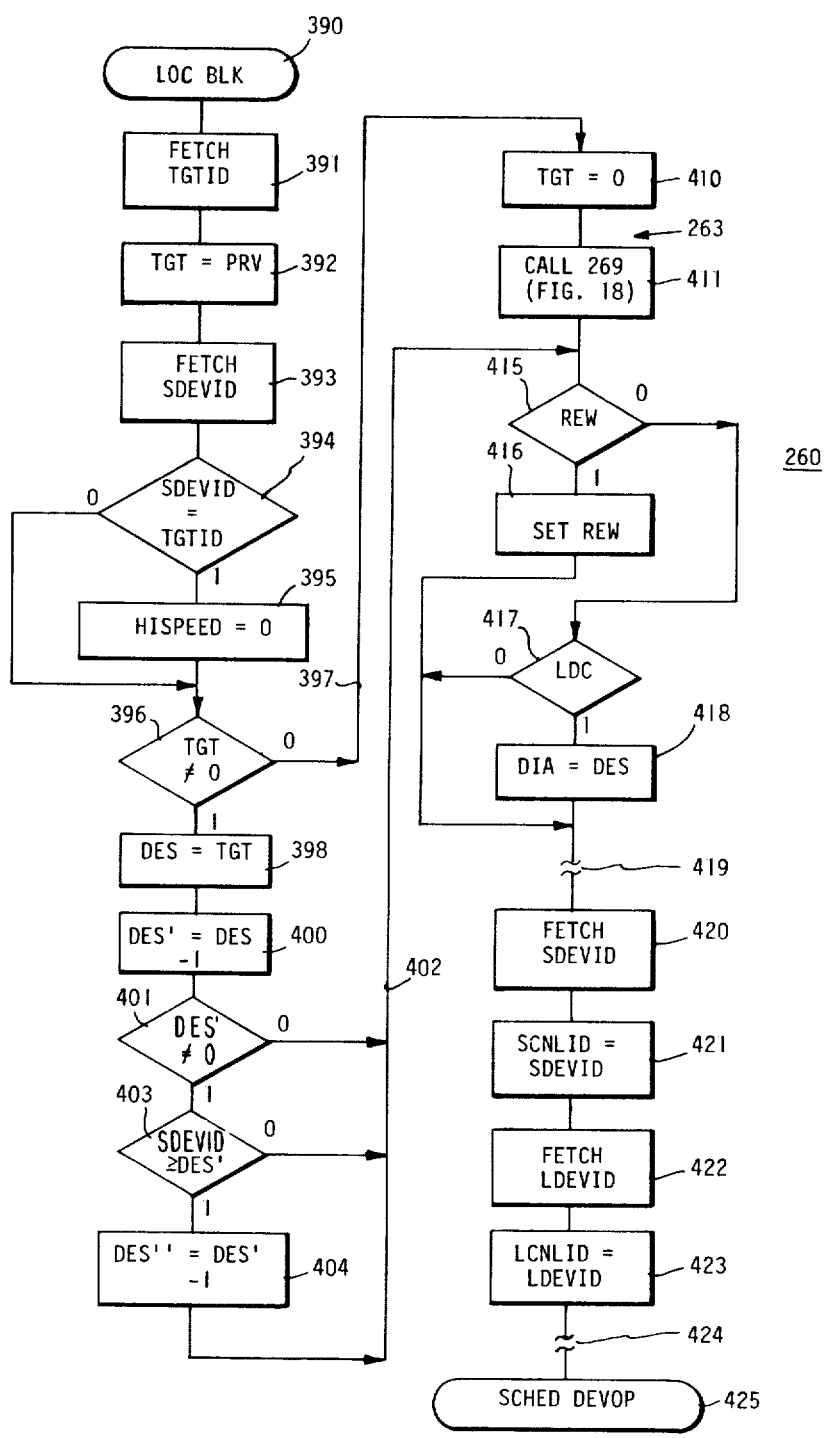
FIG. 16 is a logic flow diagram illustrating logic of operations for locating a block of data using the identification signals of the present invention.
Figure 17:
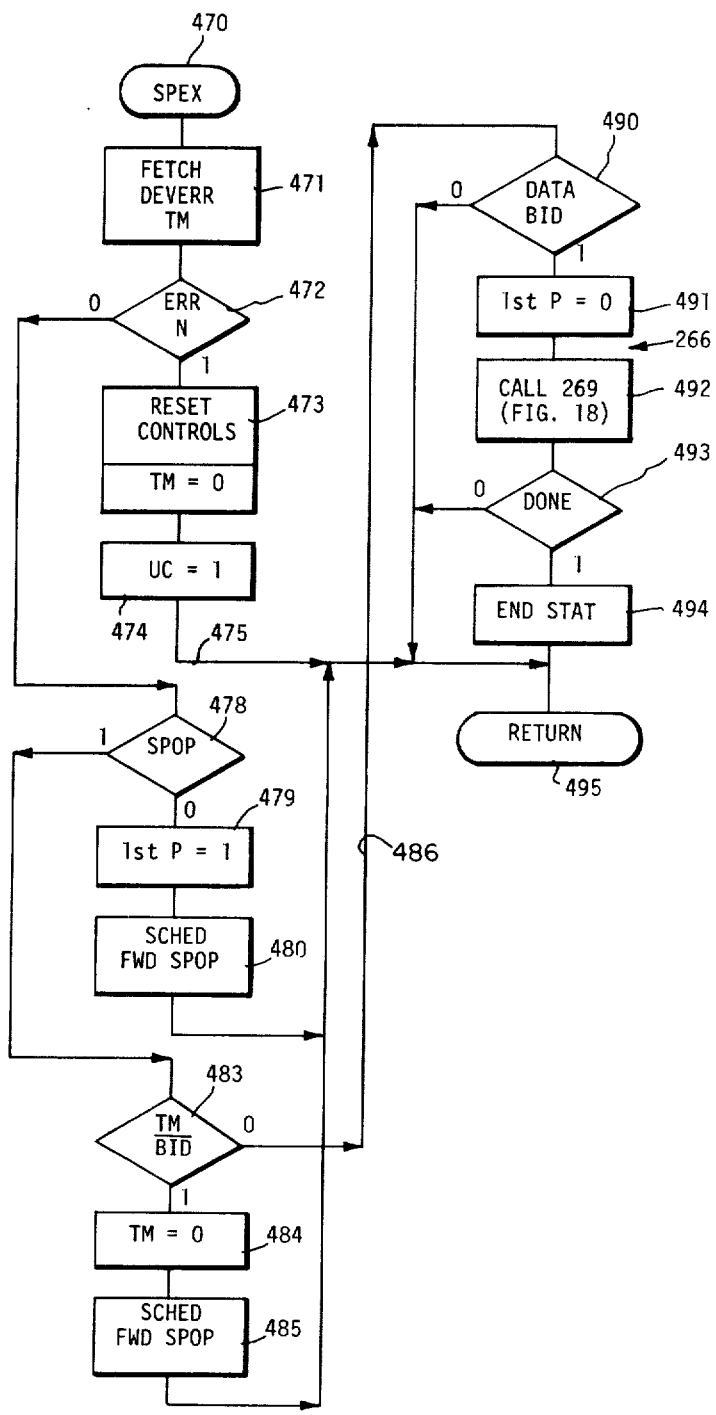
FIG. 17 is a logical extension of the FIG. 16 showing for a special execution logic flow for verifying appropriate record medium positioning.

FIG. 16 shows a detailed logic flow of LOC BLK 260 as it pertains to the present invention. The description of FIG. 16 assumes that a LOCATE channel command from host 12 has been received over path 50, has been properly decoded using known decoding techniques for control units and the module 260 has been called at 390 by the command executing module which decoded the received LOCATE command. Along with the LOCATE command, the target identification signals were supplied and are now stored in the DIA 139 at a predetermined address of control store 111 corresponding to the addressed device 13. At 391, microprocessor 110 fetches the target identification, which includes both the logical and physical portions, from DIA 139 and places them in local store 114. The PRV portion of the target identification signals is made to be the target for execution of module 260; the logical portion is ignored for this particular module but will be used later as a target in connection with CULOC 269. AT 393, microprocessor 110 fetches SDEVID from portion 63 of LDT 60 for the addressed device. A comparison between SDEVID and the PRV of the target identification signals is made at 394. If there is equality between the two physical sectors then no high speed search is required and a high speed search bit equal to 0 is set at 395. This bit is in DIA 139. If the two PRV's are unequal, then high speed locate or search is required. At 396, microprocessor 110 determines whether or not the target sector is BOT; i.e., whether or not the target sector is equal to zero or not. If it is equal to zero, then program path 397 is followed and executed as later described. Such program path results in a tape rewind being executed.

When the PRV target is not BOT, microprocessor 110 prepares for a high speed locate; i.e., a tape motion wherein the tachometer 25 of the addressed device 13 controls the actual tape motion. The destination sector (PRV) to be used by the addressed device 13 is made equal to the target PRV at 398. Destination sector is stored in a work register (not shown) of microprocessor 110. At 400, the destination PRV value is altered by decrementing such that the device 13 will position the tape one sector toward BOT from the actual target sector. At 401, microprocessor 110 determines whether or not the device destination (DES') is BOT; i.e., is it in the zero sector? If it is, then program path 402 is followed for a rewind as will be later described. If DES' is not BOT at 401, then microprocessor 110 at 403 determines whether or not the present position of tape 20 is further away from BOT than DES'. If SDEVID is greater than DES', then a rewind is called for and program path 402 is followed. On the other hand, step 404 is executed creating a DES" by subtracting one from DES' and program path 402 is followed for rewinding the tape such that the high speed locate is always in the forward direction.

Returning now to program path 397 which follows branch step 396 indicating that BOT is the target sector, a target equal to zero flag is set by microprocessor 110 at 410. This flag is in a work register (not shown) of microprocessor 110. At this time, module 269 is called at step 411 which corresponds to program path 263 of FIG. 9. Module 269 is described in detail as it pertains to the present invention with respect to FIG. 18. Upon completion, of action by module 269, the microprocessor 110 returns to module 260, joins with program path 402 to determine at step 415 whether or not a rewind (REW) is to be executed. If it is, then the rewind flag in DOT 136 is set at 416. If no rewind is called for, then at 417, microprocessor 110 checks to see if a locate sector i.e., a device 13 independent high speed locate, is to be performed. If not, non-pertinent code at 419 is executed. Otherwise, the device information area 139 receives the destination sector at 418.

Following the non-pertinent code at 419, microprocessor 110 at 420 fetches SDEVID from portion 63 of LDT 60. Then at 421, microprocessor 110 makes SCNLID in portion 61 equal to SDEVID. At 422, microprocessor 110 fetches LDEVID from portion 63 and at 423 makes LCNLID in portion 62 equal to LDEVID. At this point in time, the channel set of identification signals have been made equal to the device set of identification signals such that ensuing data transfers from buffer 15 to host 12 will be constant with the device identification signals such that buffer operations can be easily checked. This is a method of initializing the channel set of identification signals.

At 424, some non-pertinent code is executed by microprocessor 110 which at 425 then schedules the device operation for the address device in accordance with the information stored in DIA 139 by requesting a device operation from a so-called device operations manager which places the request in a queue (not shown) to be analyzed by the CUDM 158 microcode. CUDM 158 microcode then calls CUDI 157 microcode to transfer the device operation to the addressed device 13 which then performs the high speed locate independent of control unit 11. After the device operation has been scheduled as above mentioned, the microprocessor 110 returns to IDLE SCAN to look for more assignments.

Path 264 of FIG. 9 extending from LOCBLK 260 to SPEX 256 includes the device schedule operation referred to in FIG. 16, the actual high speed locate by the device 13, the arrival of tape 20 at the destination sector and the report of the successful locate by device 13 to control unit 11. In FIG. 7, this corresponds to arrow 192 and the arrival at point 193. The operation of the device 13 is such that a locate is not described because it is well known how to move tape using tachometer controls. In any event, after control unit 11 has received a report from the addressed device 13 that point 193 has been arrived at, SPEX 265 analyzes the results of that report and enables control unit 11 acting through microprocessor 110 to continue the execution of the LOCATE command. In any event, SPEX 265 is entered at 470. The first action by microprocessor 110 is to fetch certain status from CST 131; that is, when device 13 reported the completion of the high speed locate error status was also supplied. With that error status was stored in CST 131 in connection with the LOCATE command. Also whether or not a tape mark TM was found is also reported by the recording circuit 32 and stored in CS 111, CST 131 portion. Having fetched the device error status and tape mark data at 471, microprocessor 110 at 472 checks the error status for error (no error means status=0). If there is an error, at 473 the TM bit 240 of LDT 60 is reset and certain control bits not pertinent to an understanding of the present invention are reset. A UNIT CHECK flag is reset at 474 for later transmittal to host 12 to inform host 12 of the error condition. Program path 475 is followed to return to the calling module via return point 495.

Without an error condition at 472, microprocessor 110 checks at 478 for whether or not an SPOP was scheduled. The SPOP, a forward space operation, is used to determine the exact location of tape 20. A forward space causes reading of one block of signals together with identification signals. The identification signals then tell control unit 11 exactly where the tape is positioned. If no SPOP was scheduled, then a first pass at a successful space operation will have to be performed. Accordingly, a first pass flag is set at 479. This flag can be in CST 131 for indicating the status of the LOCATE command execution. Then at 480, a forward SPOP is scheduled via CUDM 158. Microprocessor 110 then returns to idle scan operations.

If a SPOP at 478 was detected, then a space operation already has been performed or requested. Then at 483, microprocessor 110 determines whether or not a TM has been read (senses bit 240 of LDT 60) and the identification signals of LDT 60 have not yet been updated; that is, the BID CHK module 227 has not updated portions 63 and 64 following a SPOP. If the above described situation does not exist, then program path 486 is followed to later described logic flow. On the other hand, if a tape mark is detected (end of the file is indicated) and portion 63, 64 has not been updated, then at 484 microprocessor 110 resets TM bit 240 of LDT 60 for the addressed device 13. A forward SPOP is scheduled at 485 in the same manner as described for step 480. After step 485, microprocessor 110 returns to IDLE SCAN view return point 495. Turn now to path 486 wherein the combination of a tape mark being read and portions 63, 64 were not updated was not met. At step 490, microprocessor 110 determines whether a data block has been read by the SPOP and the identification signals from that data block have been supplied to LDT 60 portions 64. If this situation exists, then at 491, the first pass flag of CST 131 is reset. AT this point in time in the execution of a LOCATE command, the high speed search has been completed as at 193 of FIG. 7 and control unit 11 can initiate a control unit supervised low speed search corresponding to arrow 195 of FIG. 7 and executed by CULOC 269 which corresponds to path 266 of FIG. 9. Module 269 is called at step 492 and execution of that module is described with respect to FIG. 18. After that module executes, the return is to SPEX 265 at step 493. At 493, the microprocessor 110 determines whether or not the CULOC 269 search was completed; i.e., was the target block found or unfindable. For either status, at 494, ending status is generated and put in SNS 144 for later reporting to host 12 by other CUCE 152 microprograms. If the CULOC was not complete at 493, then the module 269 is still executed. In any event, the return at 495 is to idle scan from either step 493 or 494.

Figure 18:
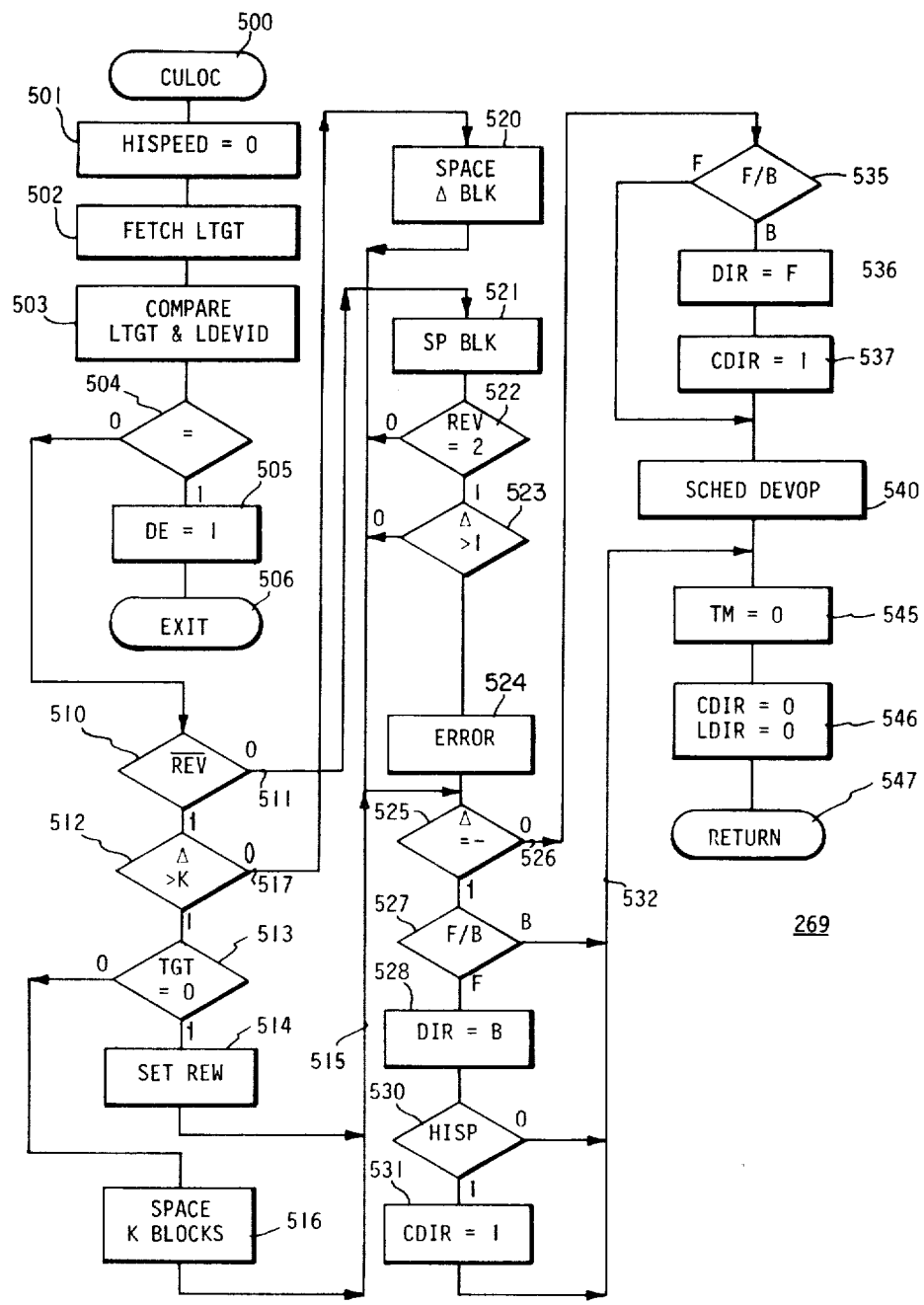
FIG. 18 is a logic flow diagram showing locating a specific block of signals recorded on tape following execution of the logic shown in FIGS. 16 and 17.

CULOC 269 is entered at 500 as shown in FIG. 18. The high speed flag for high speed locate is set to zero at 501. This action ensures that the device 13 being controlled by the control unit 11 through CULOC 269 will not be commanded to do a stand alone high speed locate. At 502, the logical portion of the target identification signals are fetched by microprocessor 110. Such signals are stored in DIA 139. AT 503, microprocessor 110 compares the numerical value of LTGT (logical target) and LDEVID of portion 64. At 504, a branch step determines whether or not the two compared values were equal. If they are equal, then the search is complete and DEVICE END in DST 140 is set to unity at 505 for later reporting to host 12 that the locate command has been completed by the addressed device 13. An exit to idle scan routine is then performed at 506.

In the case of inequality at 504, microprocessor 110 at step 510 determines whether or not the direction of tape motion has been reversed. If not, the logical compares of the target logical portion of the identification signal has not yet been found and tape motion can continue as indicated by following path 511 to later described code. If a change in direction of tape motion has occurred, then at 512 microprocessor 110 determines if the difference between LTGT and LDEVID from step 503 (results of which were stored in local store 114) is greater than a predetermined constant. If not, this means tape 20 has been positioned such as to relatively place the desired block of signals close to transducing station 23. In this event, program step 517 is followed to later described code. If the spacing is substantial; i.e., the number of blocks from the present tape position to the desired tape position is long, then at 513, microprocessor 110 determines whether or not the target is at BOT; i.e, sector No. 0. If so, then a rewind is set at 514 for later scheduling a device operation to rewind to BOT. If BOT is not the target at 513, then at 516, microprocessor 110 does an automatic forward space of K blocks (K is an integer) corresponding to the difference identified in step 512. From steps 514 and 516, program path 515 is followed to later described logic steps.

Returning to path 517, the distance to go was the large number of blocks of signals, a space operation at 520 is scheduled equal to the number of blocks of signals on tape 20 indicated by compare step 503. Then later described step 525 is entered.

From logic path 511, resulting from detecting no change in direction of tape during the locate operation, a single space block operation is scheduled at 521. After completion of that space operation, microprocessor at 522 determines whether or not a second change in direction of tape has occurred. Remember at step 510 the determination was for no reversal; therefore, logic path 511 being a 0 indicates a reversal of tape directions during the locate command. The second reversal at 522 results in a check at 523 for determining whether the number of blocks from the target block on tape 20 and the present position on tape 20 is greater than unity. If so, the second reversal and the large distance to go to target means that an error condition occured. An error code is set at 524 indicating the problem and step 525 is entered. Step 525 is also entered from steps 520, 522 in case there are not two reversals, or from step 523 when the number of blocks to target is not greater than 1.

Microprocessor 110 at 525 determines the sign of the resultant compare of step 503; that is, if the logical portion of the identification signals of the present block that was read at 521 is greater than the target, the present position of the tape with respect to transducing station 23 is further away from BOT than the target block. When the above described condition does not exist at 525, logic path 526 is followed to later described code beginning with step 535. When the condition does exist at 525, then at 527, microprocessor 110 senses the forward/backward flag of DOT 136 for the addressed device 13. If direction of motion is backward, then logic path 532 is followed to later described step 545. For forward motion, which indicates that the tape is moving away from the target, microprocessor 110 at 528 changes direction by setting the directon bit of DOT 136 of the addressed device 13 to B for backwards. Then at 530, microprocessor 110 checks to see if LOCBLK 260 was executed. If not, step 545 is entered via path 532. It LOCBLK 260 was executed, a change of direction bit in CST 131 is set at 531 and then step 545 is entered.

From path 526, microprocessor 110 checks the forward/backward flag of DOT 136 for the addressed device 13. If tape direction is backward, the direction is changed to forward at 536 by toggling the bits in DOT 36 and a change of direction flag of CST 131 is set to unity at 537. If the direction at 535 was forward, this means there has been no change in direction. A device 13 operation is scheduled at 540, if the device operation is a forward space (SPOP) then step 545 is entered from step 540 or from path 532. The TM bit of LDT 60 is reset at 545. Remember this is a locate operation and it is not necessary to maintain the data nor the tape mark indications. Then at 546, the CST 131 flags for change in direction are reset to zero such that the device operation scheduled at 540 can be indicated correctly in CST 131. IDLE SCAN is returned to at 547.

Figure 19:
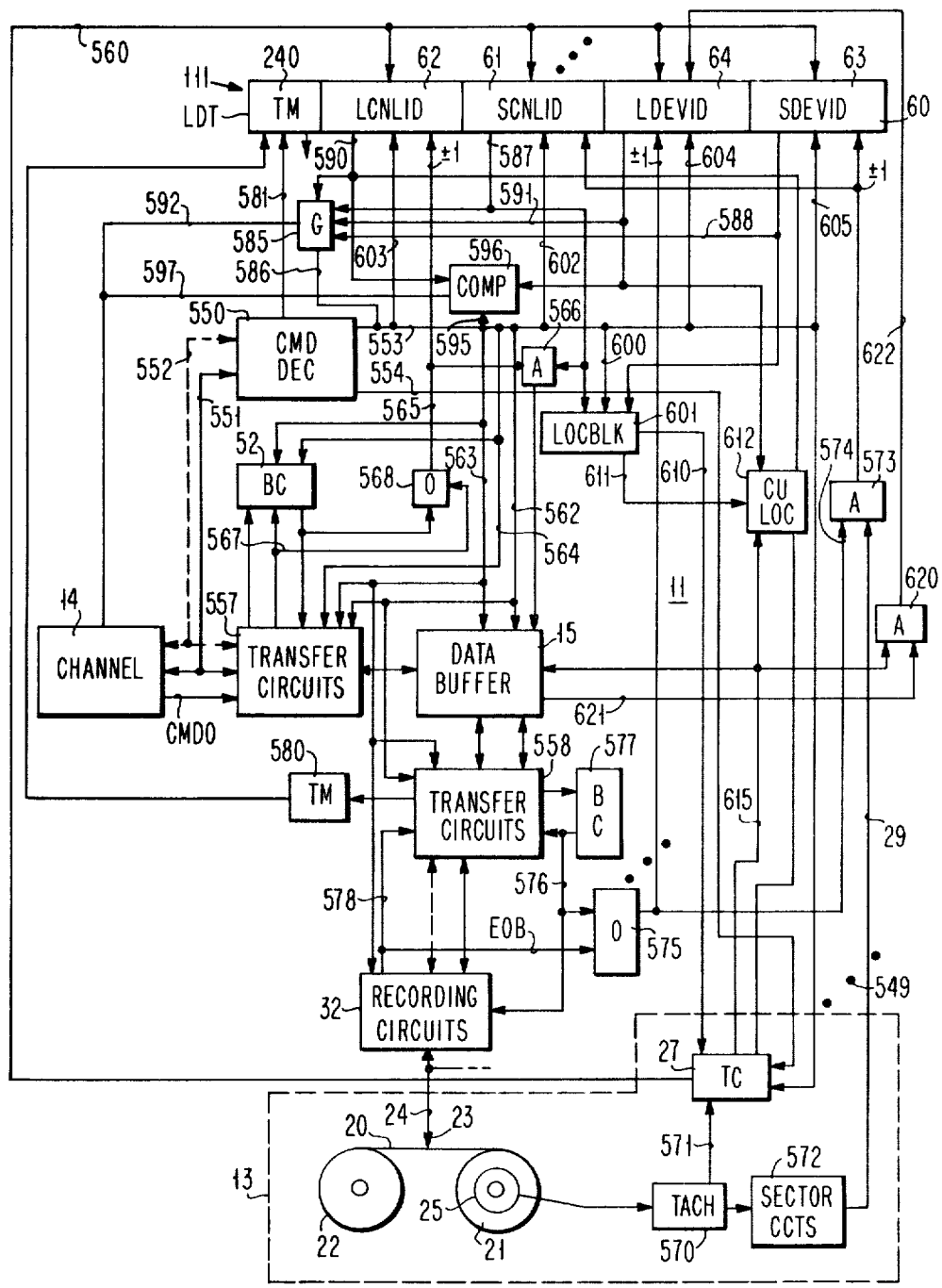
FIG. 19 is a block diagram of another implementation of certain aspects of the present invention.

Referring next to FIG. 19, an electronic logic circuit version of the invention is illustrated. Such a version would be usable in an extremely low cost controller wherein limited functions are desired. Alternatively, a series of programmable logic arrays can replace the microprocessor 110 while performing the functions described in the logic flow diagrams and as also indicated in FIG. 19. For example, any of the boxes shown in FIG. 19 can be replaced by PLA's and their associated flip-flop memory elements except of course, for device 13 electromechanical portion. FIG. 19 is designed to show the attachment of a control unit to a single device 13. It is to be understood that most of the elements of FIG. 19 for a multi-device arrangement could be replicated as indicated by ellipsis 549. In all other regards, the logic of operation is as shown for the preferred embodiment and as described with respect to the other figures illustrating the invention in connection to one or more host 12 via channel 14. Device 13 is shown in the dash line box. All of the remaining illustrations of FIG. 19 except for 549 refers to a control unit 11 in simplified form. The control unit 11 includes data buffer 15, and a block counter 52 as shown in FIG. 1. Recording circuits 32, as heretofore described, has its connection 24 to device 12. LDT 60 in the FIG. 19 embodiment provides a counter for each of the portions 61–64 and includes TLI line 29 extending from device 13 to control unit 11.

Channel 14 initiates action within control unit 11 by sending commands thereto which are decoded by command decoder 550 which can be constructed using known techniques for decoding the signal codes representing commands received over bus 551 from channel 14. Timing of the transfer of the command signals over bus 551 can be by the tag signals indicated by dashed line 552. Such tag signals and line 551 also are connected to transfer circuits 557 for transferring data signals between buffer 15 and channel 14. The command signal decoded by decoder 550 is supplied as control signals over bus 553 to the illustrated components of control unit 11, as will become more clear. Additionally, in this particular arrangement, command decoder 550 has a control signal bus 554 extending to tape control 27 in device 13; that is, command decoder 550 will supply control signals not only to control unit 11 but also to device 13. This arrangement replaces the interpretation of the decoded command by microcode modules of the preferred embodiment which then in turn issue device commands to device 13. Bus 554 carries those order signals from command decoder 550 which includes the logic for interpreting the received channel commands for device 13.

The flow of data between device 13 and channel 14 includes transfer circuit 557, data buffer 15, thence transfer circuits 558, recording circuits 32, connection 24 and finally tape drive 13 which includes transducing station 23 for exchanging signals with magnetic tape 20. Tape control 27, as is usual, includes a signal indicator (not shown) signifying the direction of tape 20 motion; i.e., forward or backward. This indication is supplied over line 560 as the forward/backward signal to control the direction of counting in portion 61–64 of LDT 60; that is, for forward motion all counting will be incrementing while for backward motion all counting is decrementing. Alternatively, the direction of tape motion can be stored within control until 11 as in the preferred embodiment.

The ensuing description shows the creation and tallying of the identification signals during a recording or writing operation. In the FIG. 19 embodiment, portions 61, 62 provide memorization of the generated identification signals while block counter 52 creates LCNLID and device 13 creates SCNLID. Similar to the previous description, the write mode is set by a mode set command received from the host 12 through channel 14. This mode set command is the same command used in present day tape control units to set up the tape storage subsystem for subsequently received write or recording commands. (The recording mode is noted in SDT 132.) The mode set is decoded by decoder 550 resulting in a control signal being supplied over line 562 to data buffer 15 for priming it to receive data through transfer circuit 557. Line 562 also carries a control signal to BC 52 for clearing that counter to a reference state. At this time, command decoder 550 may supply a signal to TC 27 over bus 554 instructing the device to rewind to BOT. In the event update in place is desired for any drive, this control signal will not be supplied by command decoder 550, but a separate rewind command would be required to cause the tape 20 to arrive at BOT. Of course, it is understood that when tape 20 is loaded into device 13, device 13 generally will automatically preposition the tape 20 to BOT. In any event, BC 52 is reset to the reference signal state. At this same time, command decoder 550 supplies a clear signal over bus 603 to LCNLID portion 62, over bus 602 to SCNLID portion 61, over bus 604 to LDEVID portion 64 and over bus 605 to SDEVID portion 63. At this point in time, the control unit 11 is ready for an ensuing recording operation. The mode set decoded command also results in a set write mode control signal being supplied over bus 554 to TC 27, as well as over line 562 to transfer circuits 557 for conditioning those circuits to transfer signals directly between channel 14 and data buffer 15. After control unit 11 and device 13 have been prepared for the ensuing write operation, suitable status signals are returned to host 12 through channel 14. Host 12 responds to the status signals by sending its first write command which is also decoded by command decoder 550. Decoding a write command results in control signals being supplied over bus 553 to line 563 which extends to transfer circuits 557 and data buffer 15 actuating those elements to receive data signals from channel 14. Line 563 also extends to transfer circuits 558 and recording circuits 32 for activating those circuits to transfer data bytes from buffer 15 to device 13 in a fully automatic manner as has been practiced in the tape recording art. The transfer of a block of signals now ensues and continues automatically from channel 14 to device 13 as heretofore mentioned. When host 12 desires to terminate recording of block of signals, which has an indeterminate length, a COMMAND OUT signal is supplied through channel 14 over tag lines 552. Command decoder 550 responds to the COMMAND OUT signal to supply a stop recording signal over line 564 which extends from bus 553. The line 564 signal actuates transfer circuit 557 to no longer transfer signals to data buffer 15 and to signal data buffer 15 that no more data is coming. Line 564 also extends to BC 52 actuating it to transfer its signal contents through OR circuits 568 over lines 565 to LCNLID 62. After such signal transfer, BC 52 increments by 1. Accordingly, LCNLID 62 contains the number of a block in data buffer 15 while BC 52 identifies a data block being received or next to be received from channel 14. At the same time the block count was supplied to LCNLID 62, BC 52 also supplies the same count through transfer circuits 557 to data buffer 15 for storage with the block of signals being recorded by device 13. AND circuit 566 responds to the line 565 signal to transfer the signal contents of SCNLID 61 over lines 587 to data buffer 15 for storage in adjacent proximity to LCNLID supplied from BC 52. Incrementation of SCNLID 61 will be later described. In any event, the creation of LCNLID 62 from BOT has been described.

It may be desired to update the tape in place. In such a situation, a special write command is supplied through channel 14. In this situation, BC 52 receives the LCNLID for the new write via bus 567 and in turn the host 12 supplied LCNLID travels through OR circuit 568 to line 565 for insertion in portion 62.

The generation of the physical reference value PRV in SCNLID 61 is next described. It will be remembered that the SCNLID 61 and the SDEVID in portion 63 are generated by device 13 and in preferred form are identical, no limitation thereto intended. Device 13 tachometer 25 supplies physical positioning signal to tachometer circuit 570 which in turn supplies position information signals over bus 571 to TC 27 for controlling the operation of the reel-to-reel tape drive including reels 21 and 22, in a usual manner. Tachometer circuit 570 also supplies positional information signals to sector circuits 572. Sector circuits 572 are an arithmetic unit for dividing the position signals by a predetermined number for defining sectors; i.e., tape lengths of tape 20 as the tape is transported past transducing station 23. Sector circuits 572 generate the tape length indicator signal for transmission over bus 29 to control unit 11. The tape length indicator signifies the number of physical sectors presently disposed between transducing station 32 and BOT. At the beginning of operations, BOT is at transducing station 23, therefore, TLI is equal to 0 or other reference value.

Within control unit 11, AND circuits 573 respond to the TLI on bus 29 and the signal on line 574 to transmit the sector information to portions 61 and 63. The control signal on line 574 occurs at end of block (EOB). In a recording operation, block counter BC 577 counts blocks transferred through circuits 558 in the same manner that BC 52 has counted the received blocks of data. Presetting of BC 577 is omitted for purposes of simplicity, it being understood that BD 577 is preset in the same manner as BC 52. In any event, the end of block signal on line 576 travels through Or circuit 575 to become the control signal on line 574. This same incrementing signal travels to portion 64 for incrementing the LDEVID in accordance with the forward/backward indication on line 560. During the readback operation, the EOB signal is generated by recording circuits 32 and supplied over line 578 to transfer circuits 558 for terminating transfer of signals into data buffer 15 as well as traveling through OR circuit 575 to actuate AND circuits 573.

Tape mark bit TM 240 is set by write tape mark signal as described for the preferred embodiment from command decoder 550 supplying a control signal over line 581. The command for writing the tape mark goes to TC 27 over bus 554 which then causes the tape mark to be recorded on tape 20. During readback operations, recording circuit 32 detects the tape mark signal pattern, transfers the identification signals through transfer circuits 558 to data buffer 15 for later transfer to LDT 60. Transfer circuits 558 respond to the tape mark signal from recording circuits 32 to set TM latch 580 which in turn sets TM bit 240 in LDT 60.

The next operation described is the transfer of identification signals in LDT 60 for device 13 to a host 12. This operation corresponds to gate 178 of FIGS. 5 and 6 and to module 245 of FIG. 9. In the FIG. 19 embodiment, AND gates 585 respond to the control signal on line 586 received from command decoder 550 to transfer the contents to LDT 60 over bus 592 to channel 14. Bus 592 is connected to the I/O channel bus in circuit referred to above for transfer to host 12. Gates 585 receive LCNLID from portion 62 over bus 590, receive SCNLID from portion 61 over bus 587, receive LDEVID from portion 64 over bus 591 and receive SDEVID from portion 63 over bus 588. Of course, command decoder 550 receives the command to transfer the identification signals from channel 14 over bus 551. Comparator circuit 596 compares LCNLID of portion 62 with LDEVID of portion 64 to indicate to host 12 the number of signal blocks in data buffer 15. Command decoder 550 receives the command for determining number of signal blocks in buffer 15 over bus 551 and supplies a control signal over line 595 to actuate comparator 596. Comparator 596 receives the above referred to values from LDT 60 over buses 590 and 591, respectively, and supplies the results of the comparison in a numerical value indicating the number of blocks in data buffer 15 over bus 597 which joins bus 592 thence to the input/output BUS IN of channel 14. The logic of operation in comparator 596 can be that of a simple comparator or an electronic circuit version of the module 245 logic description shown in FIG. 14. As shown in FIG. 19, comparator 596 only responds to the command from host 12, and does not operate with the locate function.

The locate function is initiated by command from host 12 received through channel 14 and bus 551. Command decoder 550 supplies a signal on line 600 from bus 553 to actuate LOCBLK circuit 601. Circuit 601 receive the high speed search argument SCNLID and SDEVID respectively over lines 587 and 588 from LDT 60. Logic of operation of circuit 601 is that shown in FIG. 18 for module 269. In this regard, when command decoder 550 receives the locate command, the target identification signals are transferred over buses 602 and 603, respectively, to portions 61 and 62. Accordingly, LDT 60 is intimately involved with the locate operation in this embodiment. Portions 63 and 64 of LDT 60 contain the signals signifying the actual position of tape 20 with respect to transducer 23, both in a physical and logical sense. Circuit 601 upon determining that a high speed search is necessary by device 13, sends a control order over bus 610 to TC 27 ordering the search to a given target sector corresponding to SDNLID 61 which target will be decremented by one as described for the preferred embodiment. Device 13 responds to the order on bus 610 to automatically position tape 20 with respect to transducer 23 to the specified physical sector. Upon completing that high speed locate, TC 27 supplies a complete signal over line 615 to CULOC circuit 612 which is enabled in turn by signal on 611 which is a continuance of line 600 showing a locate command. Additionally, the signal on line 615 actuates buffer 15 not to transfer any signals received from device 13. The line 615 signal also goes to AND circuits 620 for transferring the LDEVID read from the tape and thence stored in buffer 15 to LDEVID portion 64. The signal on line 615 also conditions data buffer 15, transfer such identification signals over line 621 to ANDs 620. Circuits 612 are constructed to implement the logic functions shown in modules 265 and 269 of FIG. 9.

While the invention has been particularly shown and described with reference to preferred embodiments thereof, it will be understood by those skilled in the art that various changes in form and details may be made therein without departing from the spirit and scope of the invention.

What is claimed is:

1. A record storage subsystem having a plurality of addressable signal recorder apparatus, each of said signal recorder apparatus capable of mounting a record volume for transducing operations hereinafter referred to as a mounted record volume, transducing means in each said signal recorder apparatus and being relatively movable with respect to said record volume for enabling transducing operations, a buffer memory connected to all of said signal recorder apparatus for buffering signals to and from said signal recorder apparatus, said buffer memory being connectable to a signal source-sink means, the improvement comprising:
a channel block counter means for each said signal record apparatus for counting block of said signals transferred between said signal source-sink means and said buffer memory,
a device block counter means for all of said signal recorder apparatus for counting blocks of said signals transferred between said buffer memory and said signal recorder apparatus, respectively,
PRV means in each said signal recorder apparatus for indicating present relative physical location of said mounted record volume and said transducing means, and means connected to said buffer memory for storing the count in a given one of said block counter means and said PRV means in said buffer memory in a predetermined addressable location of said buffer memory such that the stored block of signals is logically contiguous with said predetermined addressable locations, respectively.

2. A method of operating a signal recording system having a plurality of signal tape recorders, each recorder capable of recording signals on a record volume mounted thereon for transducing operations, a buffer memory connected to all of said tape recorders whereby signals can be exchanged between any one of said tape recorders and said memory, the steps of determining when blocks of signals are to be recorded on said record volumes mounted on respective ones of said signal recorders, assigning a portion of said buffer memory to such respective signal recorders for temporarily storing said blocks in preparation for recording and removing assignment of said portions from said signal recorders when no more signals are to be recorded such that the number of portions in said buffer memory may be fewer than the number of signals recorders, receiving blocks of signals to be recorded for diverse ones of said signals recorders and storing such received blocks in respective ones of said portions in accordance with which of said record volumes is to record said received blocks, independently and for each block assigning a logical address for each received block to identify a logical relation of order of receipt of such received block with other received blocks or to be received blocks for each one of said volumes, and assigning a physical address to each such received block indicating an approximate physical location in said record volume of such block when recorded thereon, respectively, storing said assigned logical and physical addresses contiguously with said corresponding blocks residing in said portions, respectively, recording each said block with said assigned addresses contiguously in said respective record volumes, and for as long as a record volume is mounted on a respective signal recorder, maintaining a separate tally of addresses for each said portion to identify blocks having been or presently stored therein in a separate tally of addresses for each volume to indicate blocks recorded on each said tape and blocks stored in said buffer memory and not yet recorded in any of said volumes.

3. The method of recording information-bearing signals in a record volume as a series of blocks of such information-bearing signals, the step of:

for each block of said signals to be recorded in said volume, storing each said block of signals to be recorded in a buffer memory, assigning a logical address to said stored block of signals indicating its position in an order of receipt of a plurality of such blocks of signals for said record volume, recording said stored blocks of signals contiguously with said assigned addresses in said record volume, and maintaining a separate tally of logical addresses of said blocks of signals having been or stored in said buffer memory whereby said blocks of signals actually residing in said buffer memory can be readily identified.

* * * * *